(12) United States Patent
Tsugai

(10) Patent No.: US 6,997,054 B2
(45) Date of Patent: Feb. 14, 2006

(54) CAPACITANCE-TYPE INERTIAL DETECTING DEVICE

(75) Inventor: Masahiro Tsugai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 38 days.

(21) Appl. No.: 10/845,504

(22) Filed: May 14, 2004

(65) Prior Publication Data

US 2004/0226377 A1    Nov. 18, 2004

(30) Foreign Application Priority Data

May 15, 2003  (JP)  .............................. 2003-136933
Mar. 3, 2004  (JP)  .............................. 2004-059391

(51) Int. Cl.
  *G01P 9/04*   (2006.01)
  *G01P 15/125*   (2006.01)

(52) U.S. Cl. ................................. 73/504.12; 73/514.32

(58) Field of Classification Search ............ 73/514.32, 73/514.29, 504.04, 504.12, 504.14, 514.38, 73/514.18, 514.24
See application file for complete search history.

(56) References Cited

U.S. PATENT DOCUMENTS

| 5,345,824 A | 9/1994 | Sherman et al. |
| 5,751,154 A | 5/1998 | Tsugai |
| 5,894,091 A * | 4/1999 | Kubota .................... 73/504.12 |
| 5,974,880 A * | 11/1999 | Yamaguchi et al. ..... 73/514.32 |
| 6,151,966 A * | 11/2000 | Sakai et al. ............. 73/514.32 |
| 6,278,283 B1 | 8/2001 | Tsugai |
| 6,504,385 B1 * | 1/2003 | Hartwell et al. ........... 324/662 |

FOREIGN PATENT DOCUMENTS

JP    8-32090    2/1996

OTHER PUBLICATIONS

Hartwell, et al.; "Signal Mask Lateral Tunneling Accelerometer", *IEEE*, Cornell University, Ithaca, NY, pp. 340-344 (1998).

* cited by examiner

Primary Examiner—Helen Kwok
(74) Attorney, Agent, or Firm—Leydig, Voit & Mayer, Ltd.

(57) ABSTRACT

An inertial detecting device for detecting a change in capacitance of a sensor element caused by inertial force includes a displaceable unit. The displaceable unit includes a movable mass member which is displaceable in the direction of an inertial force and is supported in a space by a pair of beams fixed on the substrate. At least one pair of detection units for detecting the displacement of the displaceable unit are provided on the substrate. The detection unit includes a drive unit and a pair of sensing electrodes which are disposed opposite to the displaceable unit. Any gap can be freely set between the sensing electrode and the movable mass member, thereby changing the sensitivity of the detecting device in a wide range.

10 Claims, 28 Drawing Sheets

Fig.2
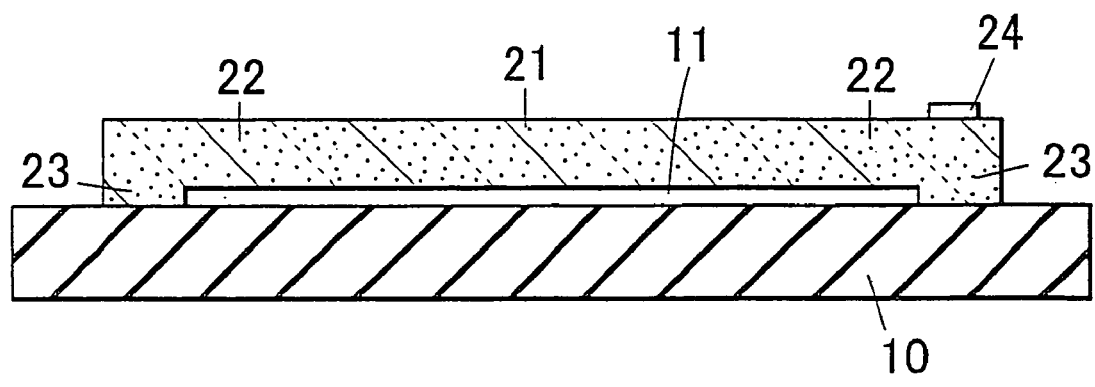
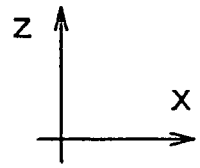
Fig.3
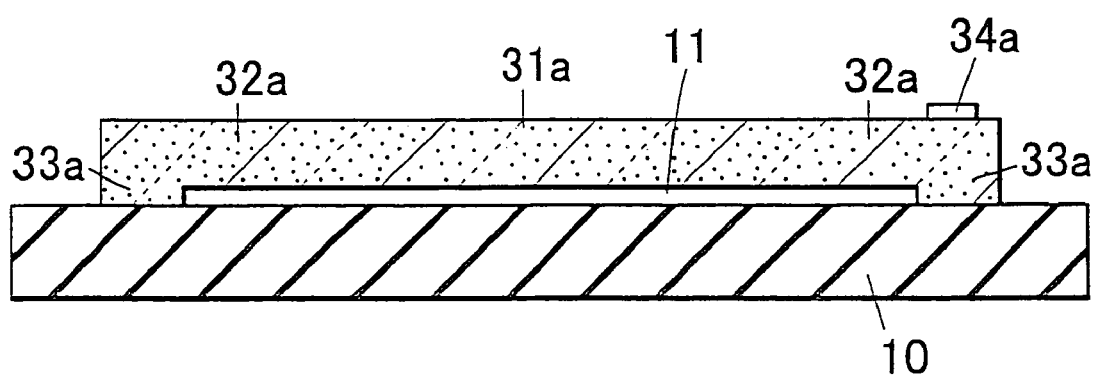
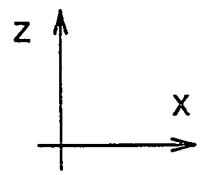

Sensitivity St (slope) = MVs / (2gK)
M: the mass of the movable member
K: the spring constant of the beam
g: the gap between the movable mass member and the sensing electrode
Vs: the detection circuit drive voltage

CAPACITANCE-TYPE INERTIAL DETECTING DEVICE

BACKGROUND OF THE INVENTION

1. Field of the Invention

The invention relates to an inertial sensor and, more specifically, to a capacitive inertial sensor that detects acceleration or angular velocity through the detection of a change in capacitance of a capacitor.

2. Description of Related Art

A conventional capacitive sensor device includes a substrate and a structure which is formed on the substrate and includes a movable mass member supported by a beam and a pair of sensing electrodes that form a differential capacitance together with the movable mass member. The sensing electrodes are fixed on the substrate, and before the measurement, namely, before the movable mass member is displaced by input acceleration, the gap (the initial gap) between the movable mass member and the sensing electrodes is fixed at a certain value. When acceleration is exerted and displaces the movable mass member, a change in differential capacitance based on the displacement is converted into a voltage output through a C-V converter (a C-V converter circuit), so that a sensor output signal is produced depending on the displacement level of the movable mass member (see, for example, Japanese Laid-Open Patent Publication No. 08-32090).

In the case of a capacitive servo-type sensor device, the potential difference between one sensing electrode and the movable mass member and the potential difference between the other sensing electrode and the movable mass member are so controlled that an electrostatic force is produced to cancel the acceleration-induced displacement of the movable mass member. In such a case, the displacement of the movable mass member is suppressed, so that an improvement in sensitivity and the desired frequency characteristic can be produced at the same time (see, for example, Japanese Laid-Open Patent Publication No. 11-326409).

The output sensitivity of a capacitive acceleration sensor (per unit of inertial force) is basically proportional to $u/g_0$ (displacement ratio), the ratio of the amount (u) of the sensing electrode displacement produced per unit of inertial force to the initial gap ($g_0$). In order for the conventional sensor device with the sensing electrodes fixed on the substrate to have an increased or decreased sensitivity, it is necessary to increase or decrease the displacement u of the movable mass member per unit of inertial force. This means that it is necessary to adjust the natural angular frequency $\omega_0$ (=$(K/M)^{0.5}$) of oscillation, which is determined by the mass (M) of the movable mass member and the spring constant (K) of the beam supporting the movable mass member. However, this means that sensor structures should be each independently designed depending on individual desired sensitivities and that sensor devices each with a suitable natural angular frequency should be each independently manufactured; thus, this causes a problem of an increase in manufacturing cost. The resonance angular frequency is a parameter that determines the effective detection frequency (bandwidth or band) of the sensor. If the resonance angular frequency is reduced for the purpose of improving the sensitivity, the bandwidth will be narrowed. Thus, there is a tradeoff between the sensitivity of the sensor and the bandwidth.

The sensitivity can be increased simply by a reduction in the initial gap. However, the ratio of the thickness H of the structure to the feasible gap $g_0$ (the aspect ratio $H/g_0$) is inherently limited in terms of manufacture. Thus, the gap cannot be equal to or less than the limitation, and this means a limitation to the improvement in sensitivity.

In some cases, sticking (a pull-in phenomenon) occurs between the movable mass member and the sensing electrode (between the electrodes) by a certain difference in drive voltage for detection (a voltage difference between the movable mass member and the sensing electrode), generally depending on the configuration of the circuit for detecting the capacitance change. The pull-in threshold voltage $V_{th}$ between the electrodes depends on the gap between the electrodes and the spring constant of the beam supporting the movable mass member. Thus, if the gap is reduced, the pull-in voltage should also be reduced, so that sticking can easily occur.

FIG. 34 shows a result of a simulation, in which the relationship is shown between the pull-in threshold voltage $V_{th}$ and the gap $g_0$ between the electrodes. In this example, the pull-in threshold voltage $V_{th}$ is obtained using a gap $g_0$ between parallel flat plate electrodes as a parameter under the conditions as shown in Table 1. In this example, the initial capacitance $C_0$ ($C_1=C_2$) is 1.87 pF when the sensor device has a resonance frequency of about 6.9 kHz in the main axis-displacement direction (y direction) and an initial gap $g_0$ of 5 μm. The pull-in threshold voltage $V_{th}$ is calculated by the following formula:

$$V_{th} = \sqrt{\frac{8\ kg_0^3}{27\ \varepsilon ah}} \tag{1}$$

FIG. 34 indicates that: for example, an initial gap $g_0$ of 5 μm produces a $V_{th}$ of about 4.95 V; $g_0$ of 1 μm produces a reduced $V_{th}$ of about 0.44 V; $g_0$ of 0.1 μm (100 nm) produces a further reduced $V_{th}$ of 0.014 V.

TABLE 1

Typical sensor structure

| Description | Value | Unit |
|---|---|---|
| Thickness of capacitance-forming sensing electrodes: (h) | 50 | μm |
| Length of capacitance-forming electrodes: (a) | 0.02108 | m |
| Gap between electrodes: ($g_0$) (parameter) | 5 | μm |
| Mass of movable electrode: (M) | 3.27E−09 | kg |
| Spring constant: (k) | 6.159458 | N/m |
| Dielectric constant, ε: (ε) | 8.85E−12 | (F/m) |
| Young's modulus: (E) | 1.48E+11 | Pa (N/m2) |

It is apparent from the result of this example that it is necessary to make the drive voltage difference very low particularly in order to prevent sticking when the gap $g_0$ is set small, so that the electrical detection sensitivity can significantly be low.

On the other hand, it is relatively easy to increase or decrease the sensitivity by electrical amplification when a certain resistance value is selected so as to increase or decrease the amplification gain of an OP (operational) amplifier. However, the noise increases or decreases in a similar manner; thus, basically, the SN ratio (the ratio of sensitivity to noise) cannot be improved. When the effective detection frequency is kept at a given design value, and the sensitivity is increased; therefore, it is basically impossible to increase the SN ratio in proportion to the rate of rise in the sensitivity.

Sensors capable of measuring very small acceleration of the order of mG or μG have a problem that since they have high sensitivity, a shock at the time when they are attached to the measuring object can cause damage to them or sticking of the electrodes to each other, so that they can have a functional disorder.

When the movable mass member is displaced by an inertial force, the gap on one sensing electrode side can become smaller than the other because the sensing electrodes are fixed. If the gap after the displacement is significantly smaller than the initial gap (the displacement rate is high), nonlinearity of the sensor output can be high.

In a case where the input acceleration varies from moment to moment, it is necessary that maximum acceleration should be estimated and that an acceleration sensor having a range including the maximum acceleration should be used. This situation can cause a problem that measurement accuracy at a smaller acceleration than the maximum has to be lowered. In addition, if acceleration is input beyond the estimated acceleration range, the electrodes can collide with each other; thus, the sensor can have a functional disorder (such as electrode breakage).

In a servo-type acceleration sensor, the resonance angular frequency of the structure is so low that the sensitivity can be high, while an increased electrical spring constant and thus an increased electrostatic force are provided so as to suppress a reduction in bandwidth and an increase in electrode displacement of the movable mass member, which would otherwise be associated with low frequency. Concerning the servo-type sensor, therefore, a wide bandwidth or an improved linearity of the sensor output requires a high electrical spring constant, which requires a large potential difference between the electrodes. Since the potential difference between the electrodes depends on the power source for the servo-type circuit, however, the improvement in sensitivity, bandwidth or linearity of the sensor output can be limited by the upper limit of the power source for the servo-type circuit. On the other hand, a small gap between the electrodes can provide a high electrical spring constant. However, the gap can only be set small within the limitations of the production.

In the inertial sensor, the sensing electrode or the movable electrode is generally formed on (bonded to) a substrate having at least one electrical insulation, and thus has different coefficients of material linear thermal expansion or a distortion produced at the time of bonding. If the temperature of the sensor device changes, the distance between the movable electrode and the sensing electrode can also change, and the amount of the change can fluctuate, so that the capacitance between the electrodes can have a temperature dependency. This situation can cause a problem that the zero point output (the offset output) or the sensitivity of the sensor can fluctuate.

In a capacitance-detecting type inertial sensor, specifically in a capacitance-detecting oscillation-type gyro, the displacement of the movable mass member, caused by Coriolis force, which is generated at rotating mass according to the principle, is detected through a change in the capacitance formed between the fixed electrode and the movable mass member (movable electrode). In such a system, it is also relatively difficult to improve the rate of displacement or the sensitivity for the same reason as mentioned above about the acceleration sensor.

SUMMARY OF THE INVENTION

It is an object of the invention to solve the above problems. Thus, the invention is directed to a capacitance-type inertial detecting for detecting a change in capacitance of a sensor element caused by inertial force, said sensor element comprising a substrate and a structure bonded to the substrate kept therefrom, said structure including a displaceable unit and at least one pair of detection units for detecting the amount of displacement of the displaceable unit, said displaceable unit including: a movable mass member which is displaceable in the direction of inertial force; a pair of beams which are connected to the movable mass member and support it in a space over the gap; and a pair of anchors which support the beams and are bonded to the substrate, and each said pair of detection units including a pair of sensing electrodes which are disposed opposite to the displaceable unit, wherein the sensing electrodes are each supported in a space over the substrate in such a manner that a variable gap is formed between each sensing electrode and the displaceable unit.

In the sensor device according to the invention, the sensing electrodes may be provided on the substrate in such a manner that a variable gap is formed between the movable mass member and each electrode. In such a structure, therefore, the initial gap $g_0$ is freely variable. Thus, the sensor sensitivity is widely variable in a single sensor structure with no design change. In addition, the sensitivity can be increased without electrical amplification. Thus, the SN ratio of the sensor can be increased in proportion to the rate of rise in the sensitivity. When the initial gap is set small, the initial capacitance can be set high, and thus the effect of potential stray capacitance can be small, which would otherwise be a cause of error, so that the sensor can be reduced in noise or non-linearity of output. In addition, the resonance angular frequency determined by the movable mass and the spring of the beam supporting it basically does not change; thus, in principle, the detection frequency band advantageously does not change (does not degrade).

Before the sensor is attached to the object to be measured, the initial gap may be set large so as to produce a low sensitivity, and after the sensor is attached, the sensing electrodes may be allowed to move in a non-contact manner, so that the gap can be adjusted to produce a high sensitivity. After the sensor is attached, therefore, the sensitivity can be so adjusted that very small acceleration such as that of the order of mG or μG can be measured. Thus, the sensor can advantageously be prevented from having a functional disorder, which would otherwise be caused by a shock at the time of attachment.

According to the invention, while the displaceable unit of the sensor element may include a movable mass member which is supported in a space by a pair of beams fixed on the substrate and is displaceable in the direction of inertial force, at least one pair of detection units for detecting the displacement of the displaceable unit are provided on the substrate in such a manner that a variable gap is provided between the displaceable unit and each detection unit. In such a structure, any initial gap can be freely set between the sensing electrode and the movable mass member. Such a structure can increase the sensitivity and the SN ratio and reduce the temperature dependency of the sensor.

BRIEF DESCRIPTION OF THE DRAWINGS

FIG. 2 is a schematic cross sectional view of the sensor element of FIG. 1 taken alone line A—A of FIG. 1;

FIG. 3 is a schematic cross sectional view of the sensor element of FIG. 1 taken along line B—B of FIG. 1;

DESCRIPTION OF THE PREFERRED EMBODIMENTS

Figure 1:
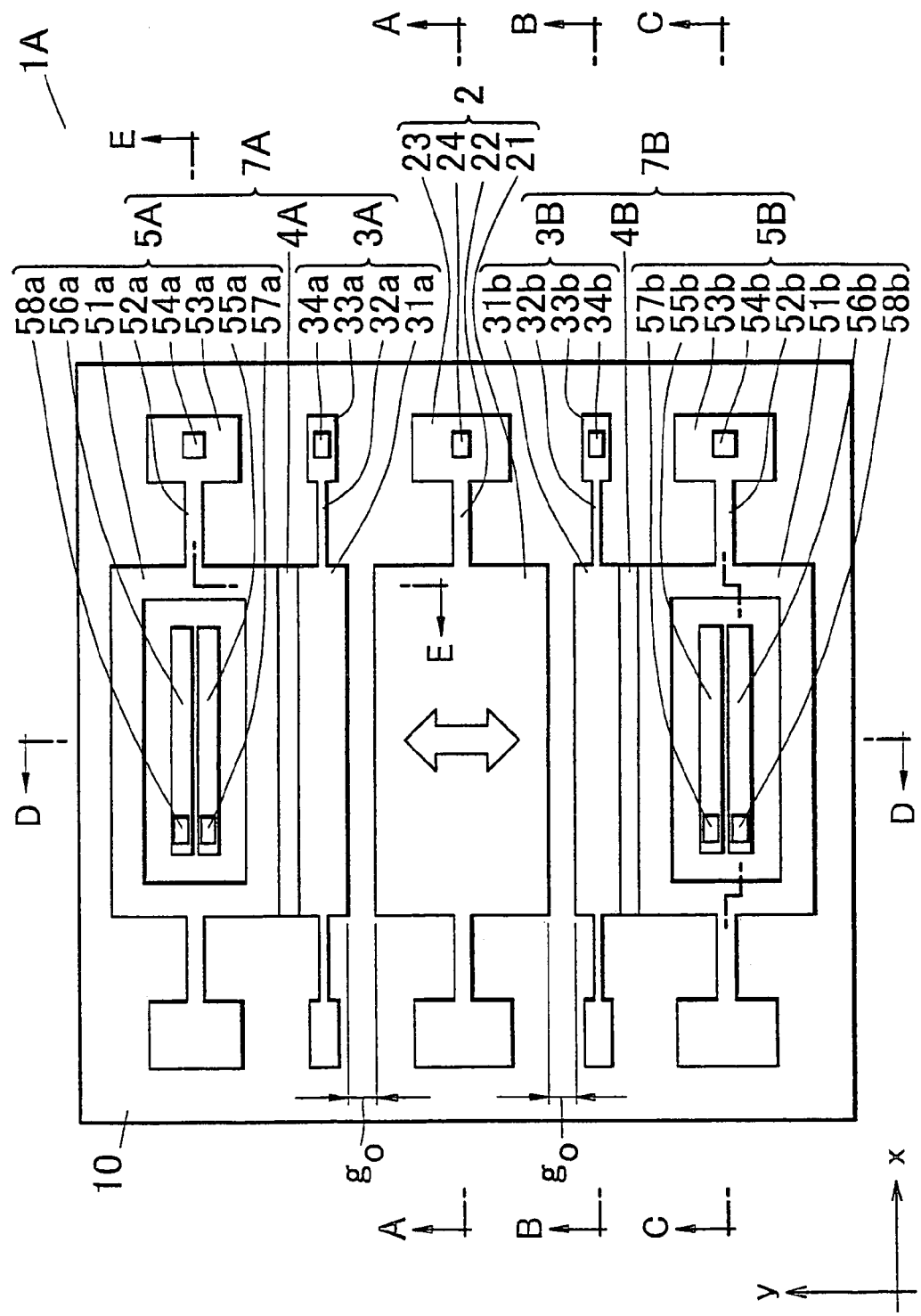
FIG. 1 is a schematic plan view showing a structure of a sensor element for a sensor according to a first embodiment of the invention.

Referring to the drawings, embodiments of the invention will be described below.

First Embodiment

Figure 4:
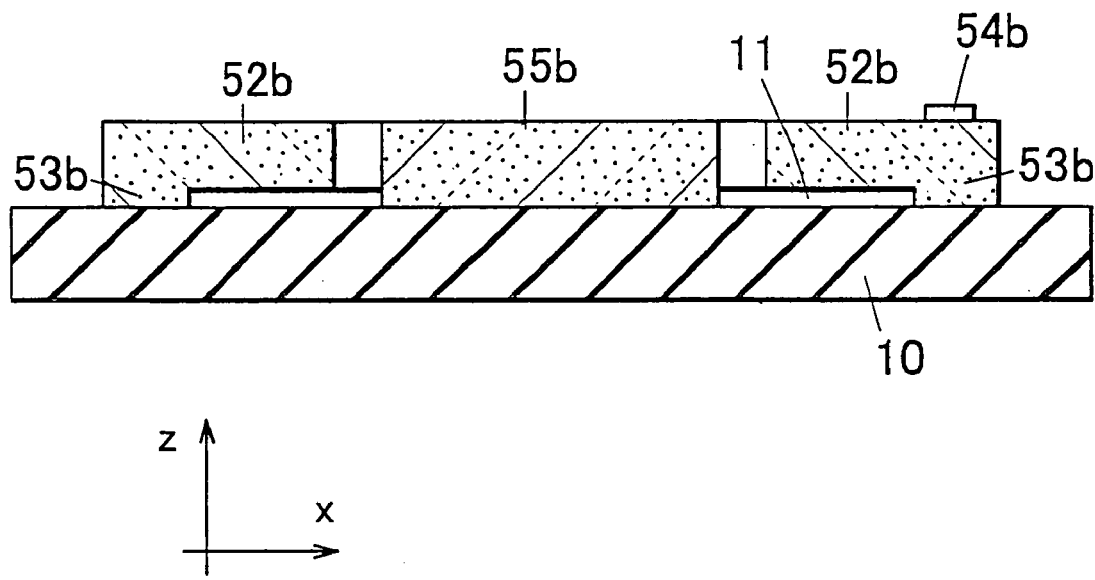
FIG. 4 is a schematic cross sectional view of the sensor element of FIG. 1 along line C—C of FIG. 1.
Figure 5:
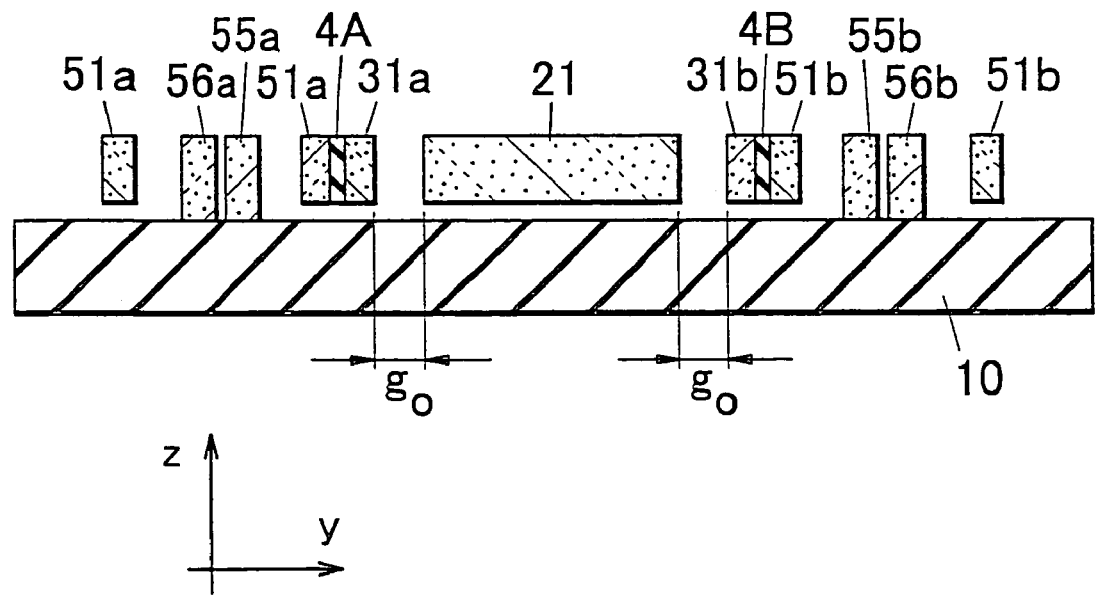
FIG. 5 is a schematic cross sectional view of the sensor element of FIG. 1 along line D—D of FIG. 1.

FIG. 1 is a schematic plan view showing the structure of a sensor element for a capacitive inertial sensor according to a first embodiment; FIG. 2 is an A—A cross sectional view of FIG. 1; FIG. 3 is a B—B cross sectional view of FIG. 1; FIG. 4 is a C—C cross sectional view of FIG. 1; and FIG. 5 is a D—D cross sectional view of FIG. 1.

Referring to FIG. 1, the sensor element includes a substrate 10, for example, having an electrically insulating layer at its surface, a displaceable unit 2 placed on the upper surface thereof, and a pair of detection units 7A and 7B, wherein the displaceable unit 2 is placed opposite to each of the pair of detection units 7A and 7B and separated by a specific gap from each of the detection units 7A and 7B. The substrate 10 may be a silicon substrate having an oxide film, a nitride film or the like at its surface, or an electrically insulating substrate such as a glass plate.

Referring to FIG. 2, the displaceable unit 2 includes a movable mass member 21 which is displaceable in the direction of inertial force, a pair of beams 22 and 22 which are each connected to the movable mass member 21 to support the member 21 in a space over a gap 11, a pair of anchors 23 and 23 which support the beams 22 and 22 and are each bonded to the substrate 10, and a terminal 24 formed on the surface of one of the anchors. In this embodiment, in response to inertial force, the movable mass member 21 is displaceable in the y-axis direction by bending elasticity of each beam 22 in the y-axis direction.

The structure of the pair of detection units 7A and 7B will be described below by the illustration of the detection unit 7A. The detection unit 7A includes a detection electrode unit 3A and a drive unit 5A both connected via an insulating layer 4A. In this structure, the detection electrode unit 3A has a pair of opposed side faces, one of which is bonded to the electrically insulating layer 4A and the other of which is separated by a specific gap $g_0$ from the side face of the movable mass member 21 and placed opposite to the side face of the movable mass member 21. Referring to FIG. 3, the detection electrode unit 3A includes a sensing electrode 31a which is displaceable in the direction of inertial force, a pair of beams 32a and 32a which are each connected to the sensing electrode 31a to support the electrode 31a in a space over the gap 11, a pair of anchors 33a and 33a which support the beams 32a and 32a and are bonded to the substrate 10, and a terminal 34a formed on the surface of one of the anchors. Referring to FIG. 5, the drive unit 5A includes a pair of fixed electrodes 55a and 56a arranged in parallel and fixed on the substrate 10, a drive electrode 51a which surrounds the fixed electrodes 55a and 56a and is movable in the horizontal direction over the upper surface of the substrate 10, a pair of beams 52a and 52a which are each connected to the drive electrode 51a to support the electrode 51a in a space over the gap 11, a pair of anchors 53a and 53a which support the beams 52a and 52a and are bonded to the substrate 10, a terminal 54a formed on the surface of one of the anchors, and terminals 57a and 58a each formed on the surface of each of the fixed electrodes 55a and 56a.

Figure 9:
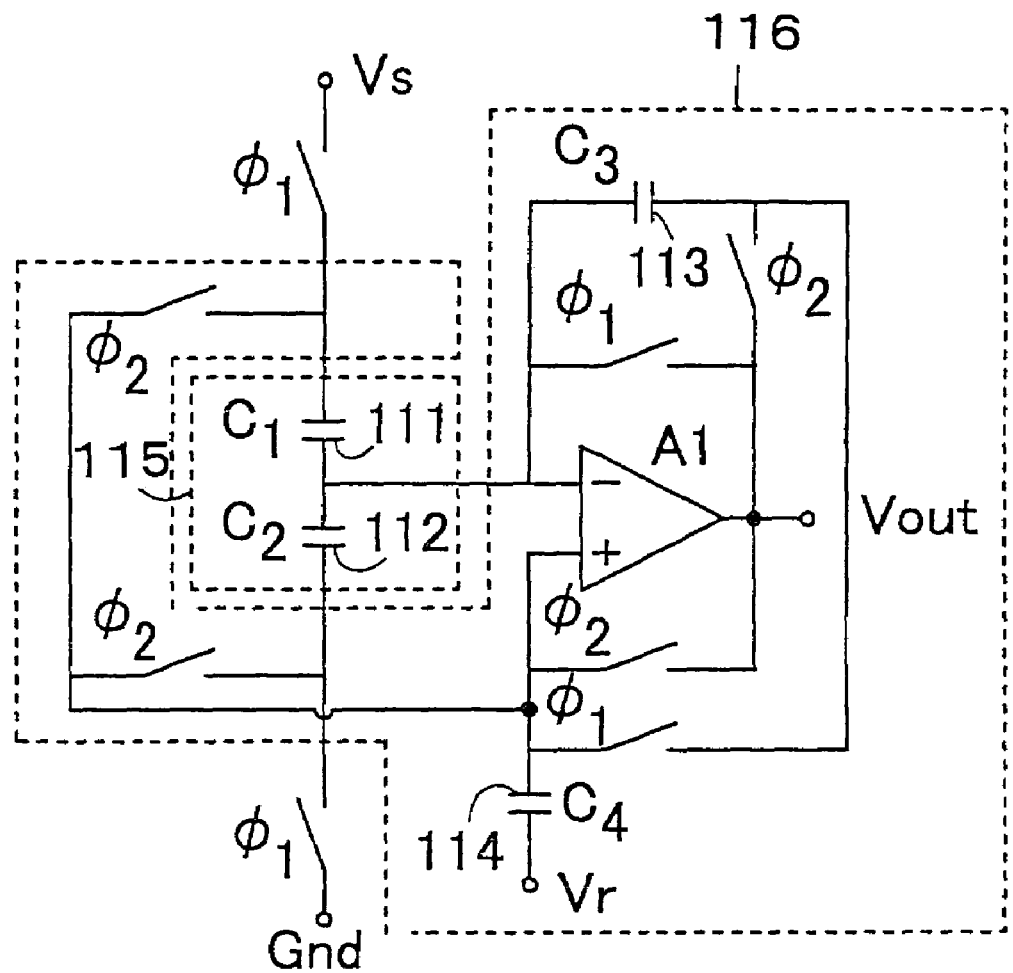
FIG. 9 is a schematic diagram (I) showing a differential capacitance-detecting circuit for the sensor according to the first embodiment.

The sensing electrode has to be electrically insulated from the drive electrode for the reason described below. The drive electrode regulates the gap between the sensing electrode and the movable mass member by its physical displacement. Thus, it is preferred that the drive electrode and the sensing electrode should be integrally displaced in the structure. When connected to a differential capacitance detecting circuit, the sensing electrode is less likely to be fixed at a constant potential (for example, no fixed potential is applied to the electrode in the circuit as shown in FIG. 9). In contrast, the drive electrode should be fixed at the desired potential (or Gnd potential) in order that the potential difference between the drive electrode and the pair of fixed electrodes arranged in parallel can be maintained at the desired value so that stable displacement can be achieved in a DC manner. Therefore, the sensing electrode and the drive electrode have to be electrically isolated from each other in order that both can independently perform each function.

Figure 6:
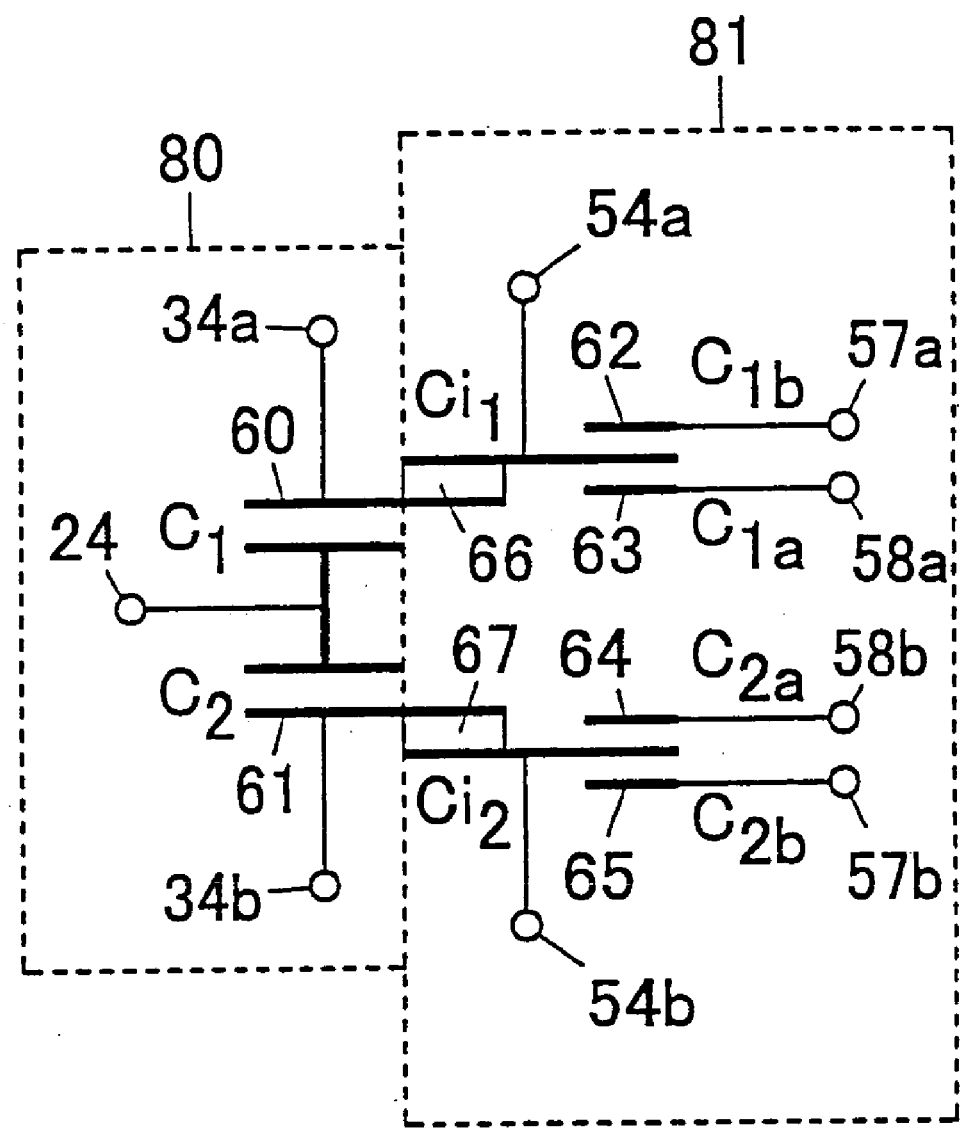
FIG. 6 is a schematic diagram showing an equivalent circuit of the sensor element of FIG. 1.

FIG. 6 shows an electrically equivalent circuit of the sensor element for the sensor device of this embodiment. The equivalent circuit includes a differential capacitance detecting portion 80 and a detection sensitivity setting portion 81. The differential capacitance detecting portion 80 includes a capacitor 60 with a capacitance $C_1$ formed between the movable mass member 21 and one sensing electrode 31a and a capacitor 61 with a capacitance $C_2$ formed between the movable mass member 21 and the other sensing electrode 31b. The movable mass member 21 and the pair of sensing electrodes 31a and 31b have terminals 24, 34a and 34b, respectively.

The detection sensitivity setting portion 81 includes a capacitor 66 with a capacitance $C_{i1}$ formed of the sensing electrode 31a of one detection unit 7A, the electrically insulating layer 4A and the drive unit 5A, a capacitor 67 with a capacitance $C_{i2}$ formed of a sensing electrode 31b of the other detection unit 7B, an electrically insulating layer 4B and a drive unit 5B, capacitors 62 and 63 having capacitances $C_{1b}$ and $C_{1a}$, respectively and formed between the fixed electrodes 55a and 56a of one detection unit 7A and the drive electrode 51a, respectively, and capacitors 64 and 65 having capacitances $C_{2a}$ and $C_{2b}$, respectively and formed between fixed electrodes 55b and 56b of the other detection unit 7B and a drive electrode 51b, respectively. A terminal 54a is formed on the anchor 53a of the drive unit 5A; terminals 57a and 58a are formed on the fixed electrodes 55a and 56b, respectively; a terminal 54b is formed on an anchor 53b of the drive unit 5B; and terminals 57b and 58b are formed on fixed electrodes 55b and 56b, respectively. These terminals are each electrically connected to the following circuit or a power supply.

Figure 7A:
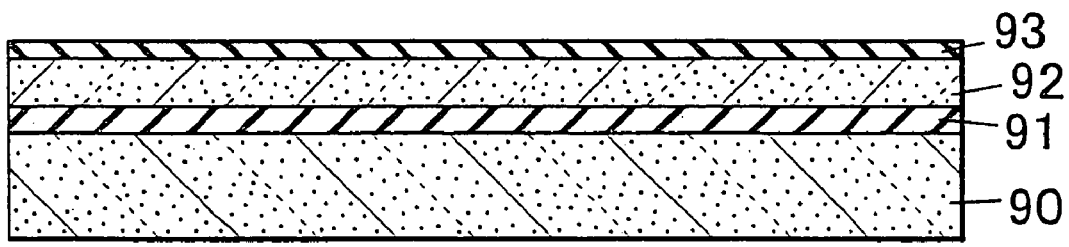
FIGS. 7A to 7E are schematic cross sectional views (series I) showing a method of manufacturing the sensor element of FIG. 1.

Referring to the schematic sectional views of FIGS. 7A to 7E and 8F to 8I, description is provided below of a method of manufacturing the sensor element according to this embodiment. FIGS. 7A to 7E and 8F to 8I each correspond to an E—E cross sectional view of FIG. 1. First, provided is an SOI (Silicon On Insulator) substrate whose surface portion may have an active silicon layer 92 about 40 μm in thickness in which an impurity is diffused at a high concentration, and a silicon oxide film 91 about 1 μm in thickness placed under the layer 92 (FIG. 7A). A silicon oxide film 93 about 1 μm in thickness may be formed on the upper surface of the active silicon layer 92.

Figure 7B:
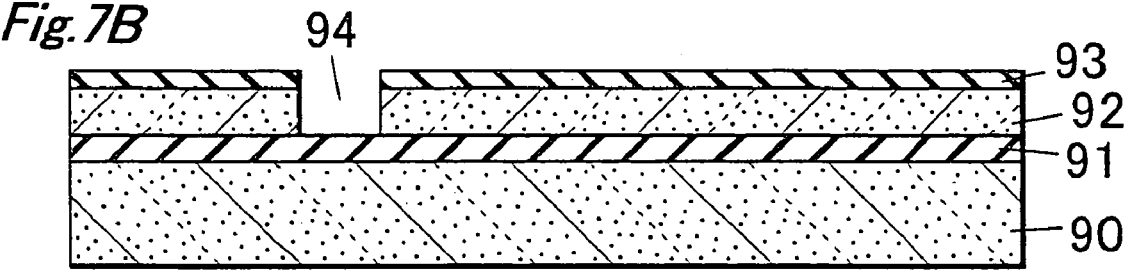
Figure 7C:
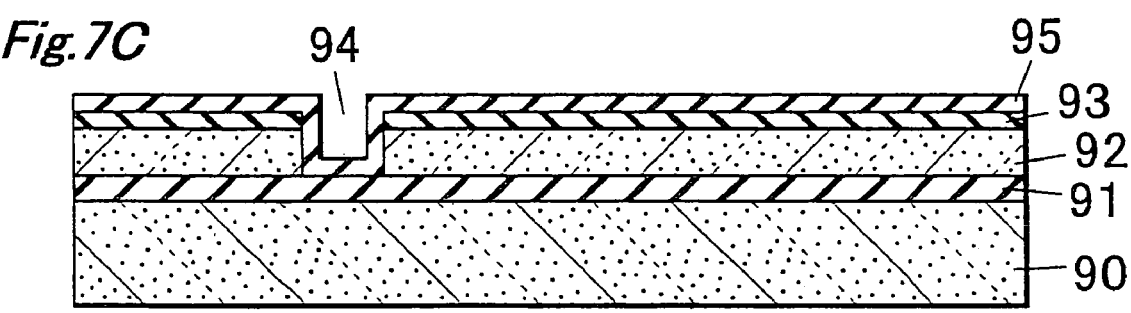
Figure 7D:
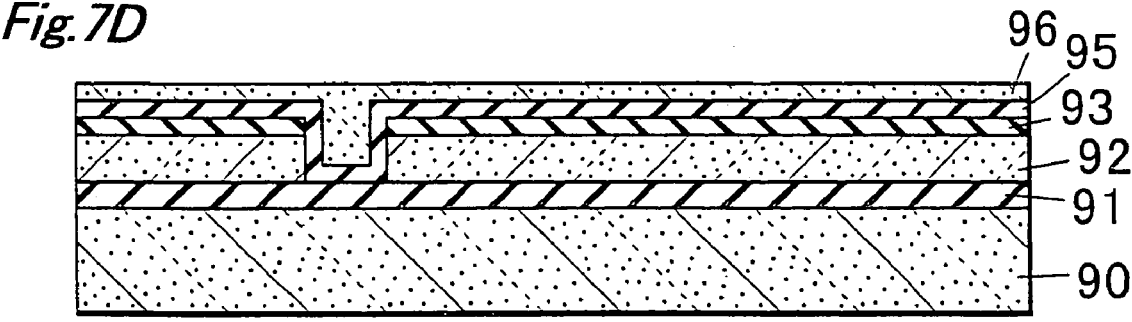

The region of the electrically insulating film 4A as shown in FIG. 1 is then formed as follows. The silicon oxide film 93 is partially removed by photolithography or wet etching, and then the active silicon layer 92 under the film 93 is etched by ICP-RIE (Inductive Coupled Reactive Ion Etching) or the like to form a trench 94 (FIG. 7B). A nitride film 95 about 2500 angstroms in thickness is then formed over the trench 94 and the silicon oxide film 93 by LPCVD (FIG. 7C). A polysilicon film 96 is then formed over the nitride film 95 by LPCVD, and the trench 94 is filled with the polysilicon (FIG. 7D).

Figure 7E:
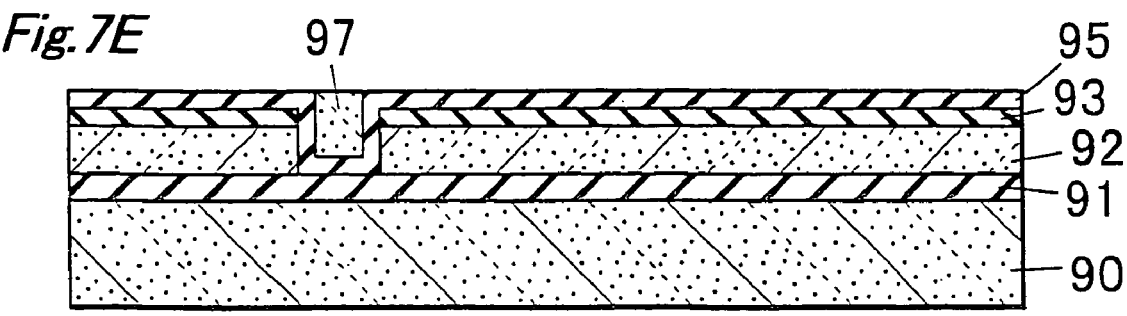
Figure 8F:
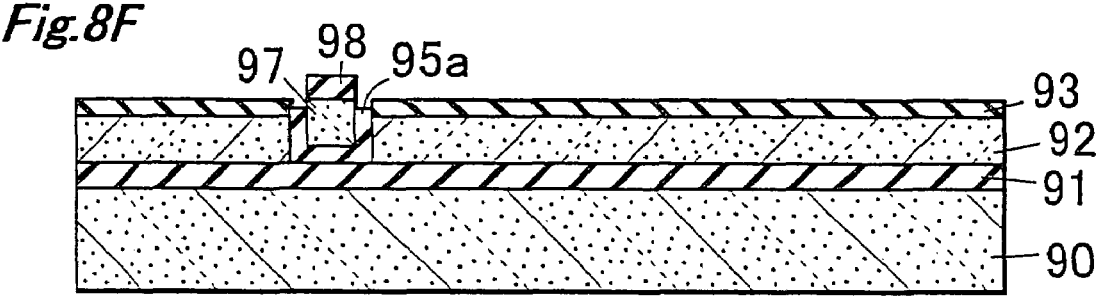
FIGS. 8F to 8I are schematic cross sectional views (series II) showing a method of manufacturing the sensor element of FIG. 1.
Figure 8G:
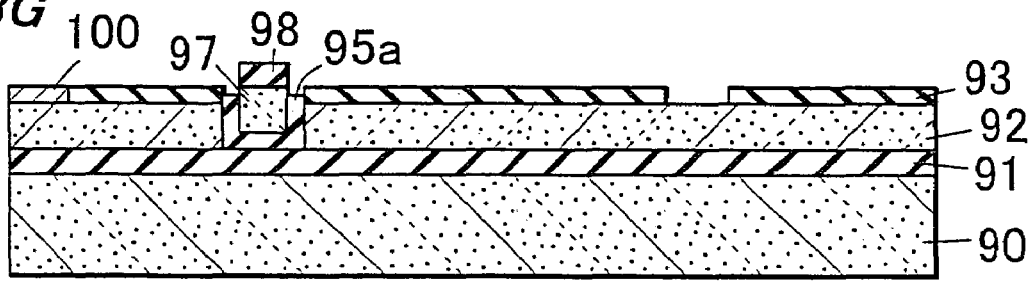
Figure 8H:
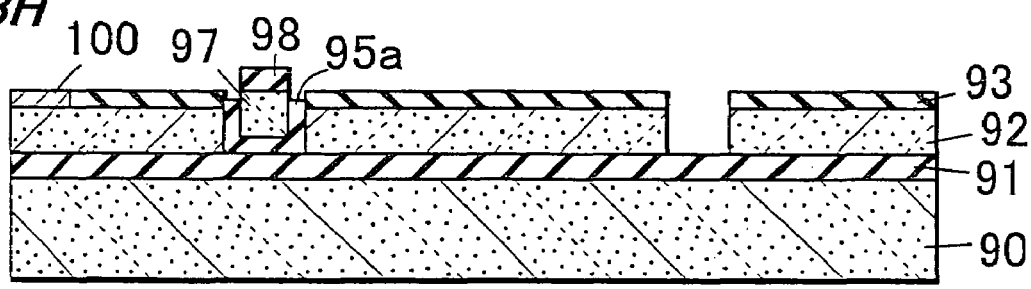
Figure 8I:
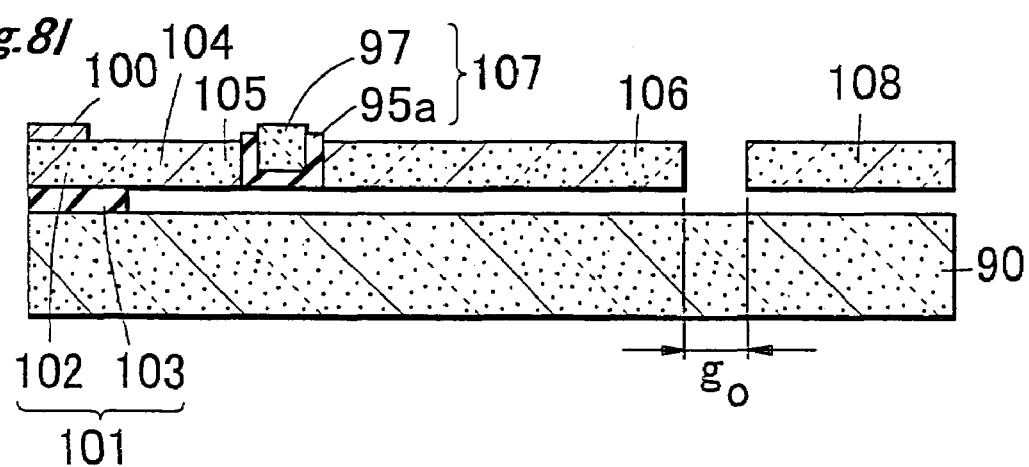

The polysilicon film 96 excluding the polysilicon portion 97 in the trench 94 is then removed by CMP (Chem-Mechanical Polishing) (FIG. 7E). The surface portion of the polysilicon portion is then oxidized by heat to form a silicon oxide film 98, and then the nitride film 95 is removed by RIE or the like in such a manner that only the portion placed on the side and bottom of the polysilicon portion 97 is retained as a polysilicon protecting portion 95a (FIG. 8F). In the process of forming an electrical contact, the silicon oxide film 93 is partially removed, and then Al or Cr/Au is sputtered and patterned by lift-off method or the like to form a terminal 100 (FIG. 8G). In the process of forming a silicon structure, the oxide film 93 is patterned into the desired shape and etched (FIG. 8G). The active silicon layer 92 is then etched into a specific pattern by ICP-RIE (FIG. 8H). Wet etching with hydrofluoric acid or the like is then performed to remove the silicon oxide film 91 in such a manner that the portion of an anchor silicon oxide film 103 for forming a lower portion of the anchor is only retained. In this process, only the anchor silicon oxide film 103 is left by control of the stop time of the etching. The silicon structure formed by the above-described process includes: an anchor portion 101 including the anchor silicon oxide film 103 forming the lower portion of the anchor and an anchor silicon film 102 forming the upper portion of the anchor; a beam 104 of the drive unit supported by the anchor portion 101; a drive electrode 105 of the drive unit connected to the beam 104; an electrically insulating layer 107 which is in contact with the drive electrode and includes the polysilicon portion 97 and the polysilicon protecting portion 95a with which the polysilicon portion is covered except for the upper surface; a sensing electrode 106 in contact with the electrically insulating layer 107; and a movable mass member 108 which is separated by a gap $g_0$ from the electrode 106 and placed opposite to the electrode 106, wherein the silicon structure is movable.

Description will be given of basic operation of the sensor element for the sensor device of this embodiment.

When inertial force is exerted on the movable mass member in the +y direction to produce a displacement u in the +y direction, the detection capacitances $C_1$ and $C_2$ approximately changes as follows:

$$C_1 = C_0/(1-u/g_0),\ C_2 = C_0/(1+u/g_0) \quad (2)$$

wherein $C_0$ is a capacitance at the time when the movable mass member is not displaced and approximately calculated with the gap $g_0$ between the movable mass member and the sensing electrode, the facing area S and the dielectric constant ∈ by the following formula:

$$C_0 = \epsilon S/g_0 \tag{3}$$

The capacitance change induced by the displacement u can produce a voltage output $V_{out}$ as shown below through a differential capacitance detecting circuit (a C-V converter) (shown in FIG. 9), for example, as disclosed in Japanese Patent No. 3125675.

Referring to FIG. 9, the circuit includes a sensor element 115, an OP amplifier A1, a feedback and sampling capacitor 113 (with a capacitance $C_3$), and a hold capacitor 114 (with a capacitance $C_4$). A single OP amplifier A1, the feedback and sampling capacitor 113 and the hold capacitor 114 constitute a switched capacitor circuit and a voltage hold and feedback circuit 116.

Figure 10:
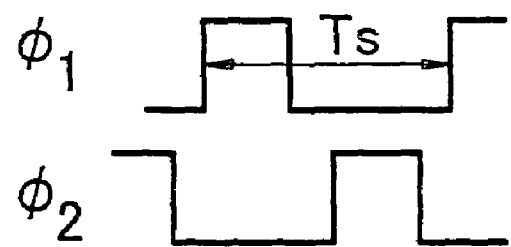
FIG. 10 is a schematic diagram showing clock timings for driving a switch of the sensor according to the first embodiment.

In the timing of the clock signal $\phi_1$ as shown in FIG. 10, a charge $Q_3$ is stored in the feedback and sampling capacitor 113 by an input offset voltage $V_{os}$ of the OP amplifier. Charges $Q_1$ and $Q_2$ are stored in the capacitors 111 and 112, respectively, which constitute the sensor element 115.

$$Q_1 = [V_s - (V_{os} + V_m)] \cdot C_1 \tag{4}$$
$$Q_2 = (V_{os} + V_m) \cdot C_2$$
$$Q_3 = V_{os} \cdot C_3$$

wherein $V_m$ represents a potential of an inverting input terminal of the OP amplifier at a certain sampling time on the clock signal $\phi_1$, and $V_s$ represents an input power supply voltage.

A difference $\Delta Q$ between the charges stored in the capacitors 111 and 112, respectively, in the timing of the clock signal $\phi_2$, is converted into a potential difference $\Delta V$ with the sum of the combined capacitances of the capacitors 113, 111 and 112, $C_1+C_2+C_3$. At this time, the OP-amp output terminal is connected to the OP-amp non-inverting input terminal in synchronization with the clock signal $\phi_2$; and thus, the potential difference $\Delta V$ is given to the OP amplifier as a difference between the inverting potential and the non-inverting potential. Thus, the output of the OP amplifier increases or decreases depending on the sign of the potential difference $\Delta V$. Depending on the potential of $V_{out}$, charge flows into the capacitor 114 from the OP amplifier or flows out of the capacitor 114, and in the timing of the clock signal $\phi_1$, the voltage between the terminals of the capacitor 114 holds a potential level at the time immediately before the clock signal $\phi_2$ attains low level. Such operation is repeated so that the OP-amp output attains a constant voltage $V_{out}$ so as to allow the capacitors 111 and 112 to store the same charge.

Thus, the following formula is established:

$$V_s = (Q_1 - Q_2 + Q_3)/(C_1 + C_2 + C_3) \tag{5}$$

Substitution of Formula (4) into Formula (5) and organization yield the following formula:

$$V_{out} = [C_1/(C_1+C_2)] \cdot V_s \tag{6}$$

Substitution of Formula (2) into Formula (6) and organization yield the following formula:

$$V_{out} = (1+u/g_0) \cdot V_s/2 \tag{7}$$

wherein $V_s$ is a detection circuit drive voltage.

When inertial force of DC acceleration A is exerted on the movable mass member, the displacement u of the movable mass member is represented by the formula:

$$u = MA/K \tag{8}$$

The sensor output sensitivity $S_t$ per unit of inertial force is represented by the following formula:

$$S_t = MV_s/(2g_0 K) = V_s/(2g_0 \omega^2) \tag{9}$$

wherein K is a spring constant of the spring (beam), and M is the mass of the movable mass member.

Thus, there may be three ways to improve the sensitivity $S_t$: making the resonance angular frequency $\omega^2$ (=K/M) of the oscillation system small; making the gap $g_0$ small; and making the detection circuit drive voltage $V_s$ high.

In the process of designing a conventional sensor device, the resonance angular frequency $\omega^2$ is often made low for the purpose of increasing the sensor output sensitivity. It is because the design margin of the detection circuit drive voltage is not so large. However, such a small resonance angular frequency leads to limitations on the effective frequency range (bandwidth and band) due to the resonance angular frequency, and thus the sensor output sensitivity should be traded off against the band. In contrast, the value of the gap $g_0$ is variable in the sensor element of this embodiment, whereby the sensor output sensitivity can be increased, and thus basically, the bandwidth of the sensor output is not limited.

In this embodiment, the relationship between an upper limit to the measurable frequency and the SN ratio can be significantly improved, which has been difficult to achieve in the conventional capacitive acceleration sensor. The upper limit to the measurable frequency is limited by the resonance frequency of the oscillation system, which is determined by the movable mass M and the spring constant of the beam supporting the mass. In this embodiment, however, it is possible to make the resonance frequency high and thus to make the effective frequency range large. The sensitivity decreases in inverse proportion to the square of the angular resonance frequency ω according to Formula (9). However, if the gap g is made small by means of the gap-changing function, the reduction in sensitivity can be avoided or suppressed. Thus, measurement can be performed up to a certain frequency region which has been difficult to measure with the conventional capacitive sensor.

Description will be given of a mechanism for changing the gap $g_0$.

Figure 11:
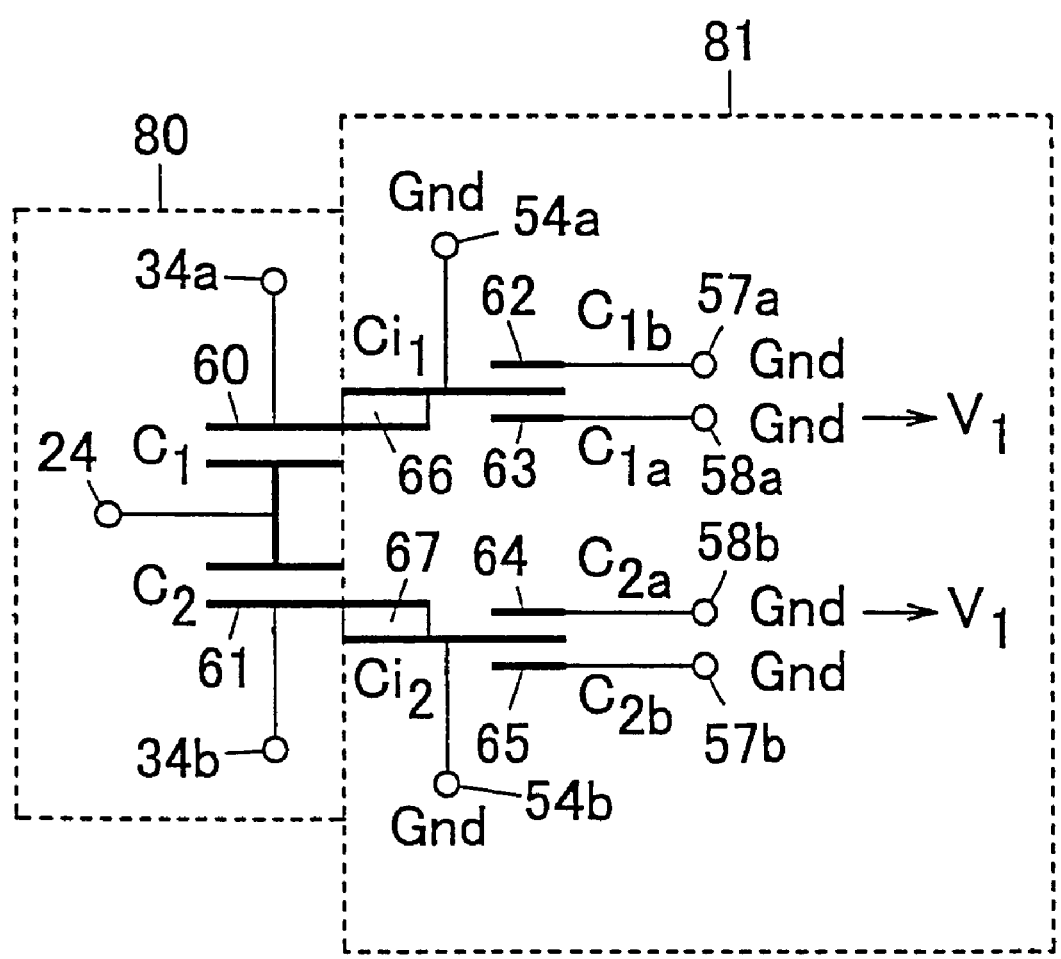
FIG. 11 is a schematic diagram (II) showing another differential capacitance-detecting circuit for the sensor according to the first embodiment.
Figure 12:
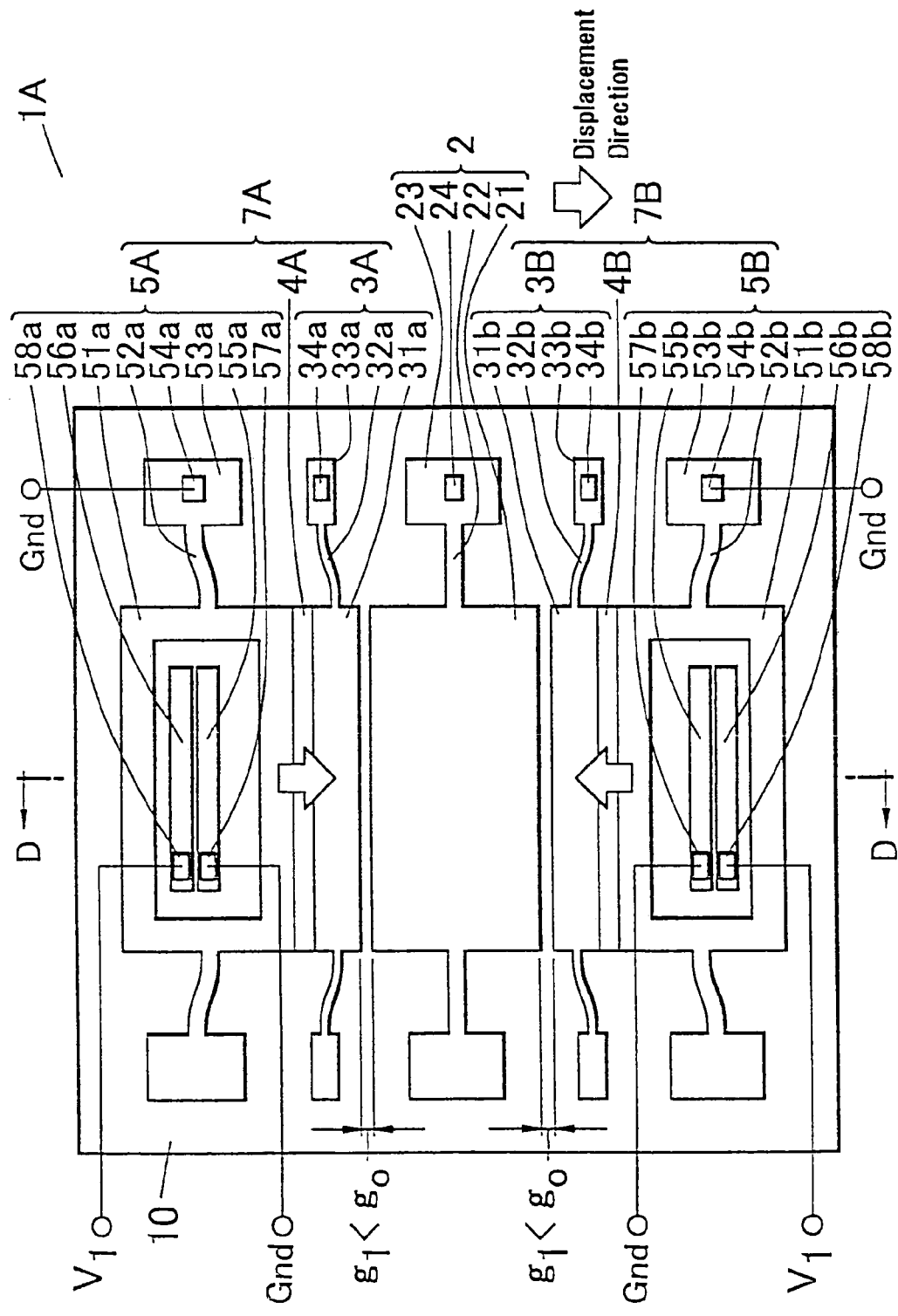
FIG. 12 is a schematic plan view showing the structure of the sensor element of FIG. 1 at the time when each detection unit is allowed to move toward the movable mass member.
Figure 13:
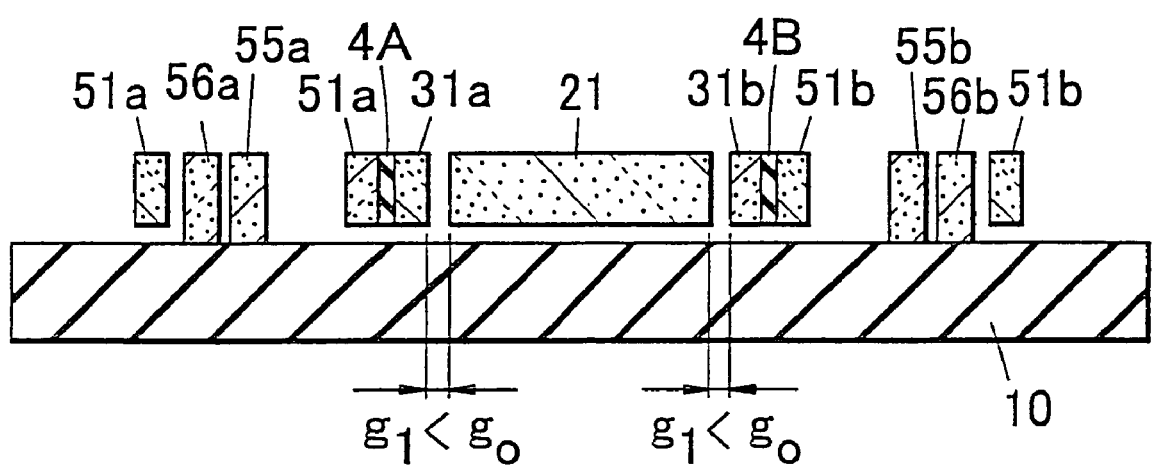
FIG. 13 is a cross sectional view of the sensor element of FIG. 12 taken along line D—D of FIG. 12.

For example, the method described in Japanese Patent No. 3125675 may be used to apply voltage to the differential capacitance detecting circuit. FIG. 11 shows voltages applied to the terminals 57a, 57b, 58a and 58b of the detection gap setting portion 81, using the equivalent circuit of FIG. 9. FIG. 12 is a schematic plan view showing the state of the sensor element 1 at the time when the detection units 3A and 3B are brought closer to the movable mass member 21. FIG. 13 is a schematic A—A cross sectional view of FIG. 1.

In this example, the terminals 54a and 54b of the drive units 5A and 5B are connected to electrical Gnd (Ground), respectively; the terminals 57a and 57b in connection with the fixed electrodes 56a and 56b, respectively, are connected to Gnd; and the terminals 58a and 58b in connection with the fixed electrodes 55a and 55b, respectively, are connected to a voltage source $V_1$. Thus, an electrostatic attraction is exerted between the fixed electrode 55a and the drive electrode 51a, depending on the potential difference $V_1$ and the air gap capacitance $C_{1a}$ between the fixed electrode 55*a* and the drive electrode 51*a*, so that the detection unit 3A is displaced by ua in the direction of moving toward the movable mass member 21. The detection unit 3B is also displaced by ua in the direction of moving toward the movable mass member 21 through the same mechanism. Thus, the gap between the movable mass member 21 and the sensing electrode 31*a* or 31*b* is reduced from the initial $g_0$ to $g_1$ by ua.

As a result, the output voltage $V_{out}'$ of the present sensor element is represented by the formula:

$$V_{out}' = (1 + u/g_1) \cdot V_s/2 \tag{10}$$

The sensor sensitivity $S_t'$ is represented by the formula:

$$S_t' = V_s/(2g_1\omega^2) \tag{11}$$

Thus, the ratio between the sensitivities before and after the displacement of the detection unit is represented by the formula:

$$S_t'/S_t = g_0/g_1 \tag{12}$$

This indicates that if $g_1$ is made smaller, the sensitivity can be increased.

Figure 14:
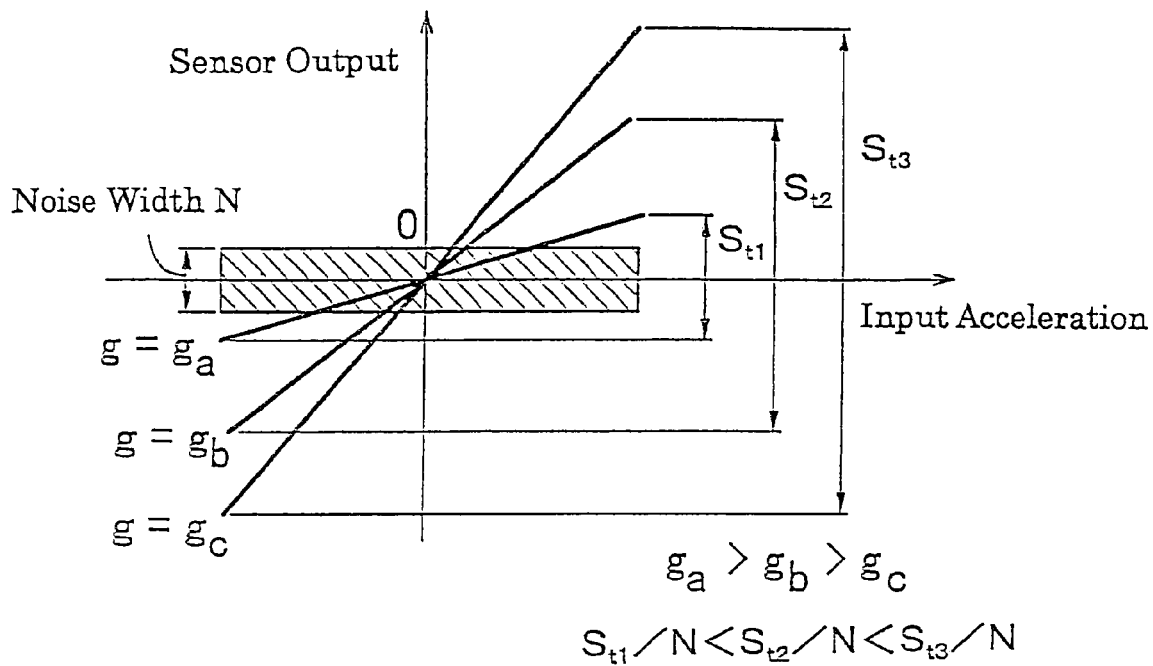
FIG. 14 is a graph showing the relationship between sensor output and input acceleration.

FIG. 14 shows an example of the relationship between the sensor output and the input acceleration, wherein the detection unit is allowed to move so that the initial gap between the sensing electrode and the movable mass member attains three different values $g_a$, $g_b$, and $g_c$. With respect to each gap, a linear relationship is given between the sensor output and the input acceleration, wherein the gradient of the straight line gives the sensor sensitivity. The gap varies in the order of $g_a > g_b > g_c$, and the sensor sensitivities $S_{t1}$, $S_{t2}$ and $S_{t3}$ correspond to the initial gaps $g_a$, $g_b$ and $g_c$, respectively. The result as shown in FIG. 14 indicates that the smallest initial gap $g_c$ produces the highest sensitivity. If the Brownian noise is neglected, on the other hand, the total noise width N of the sensor output should be constant regardless of the size of the initial gap as shown by the diagonally shaded area in the drawing. Thus, when the detection unit is allowed to move so as to produce a smaller initial gap, the sensor can have a higher SN ratio.

In some cases, with respect to the general cause of an increase in sensor noise or degradation in accuracy, stray capacitances, which are produced between the respective electrodes, between wirings for electrical connection (such as leads, bonding wires and pads) or from the input capacitance of the detection circuit, can be at non-negligible level relative to the initial capacitance $C_0$ of the sensor. However, when the initial gap is set small, it is apparent from Formula (3) that the initial capacitance $C_0$ can be set high. Thus, the influence of the stray capacitance can be reduced so that the noise can be reduced and that the accuracy can be increased.

Any differential capacitance detecting circuit may be used which has the functions of measuring the displacement of the movable mass member and converting it into a voltage (electrical) output. Particularly in the C-V converter as shown in FIG. 9, the potential of the movable electrode is determined in such a manner that the same charge can be stored in both detection capacitors $C_1$ and $C_2$ formed between the sensing electrode and the movable mass member, and thus the difference in the electrostatic attraction between the respective electrodes can be made relatively small. The combination of the movable detection unit and the charge balance-type C-V converter as shown in FIG. 11 can have a significant advantage that the pull-in phenomenon can hardly occur even when the initial gap is set very small for higher sensitivity.

The charge balance-type C-V converter is not limited to the converter as shown in FIG. 9. Also applicable is any other converter having the system in which equivalent charge can be stored-between the movable mass member and each sensing electrode.

In this embodiment, the detection unit may be allowed to move in such a manner that the initial gap increases. For example, there may be a problem that the sensor can be broken or have a functional disorder by an excessive shock G generated when the sensor is attached to the object for measurement of very small acceleration, for example, at few mG or μG level. Against such a problem, the initial gap may be made large so as to produce a low sensitivity, before the sensor is attached to the object. For the purpose of measuring very small acceleration, the initial gap may then be made small electrically so that the detection sensitivity can be made high by electrical external operation in a non-contact manner. Thus, the sensor can be prevented from being broken or having a functional disorder by an excessive shock G at the time of attachment.

For example, the method below may be used to make the initial gap large (to reduce the sensitivity). In order to reduce the sensitivity, the potential is applied to the fixed electrodes in a reverse manner to that shown in FIG. 9. Specifically, the terminals 58*a* and 58*b* are set at the Gnd potential, and the terminals 57*a* and 57*b* are set at the potential $V_1$, so that the detection units 3A and 3B are each displaced in the y direction to be away from the movable mass member 21. Thus, the initial gap $g_0$ is increased by ub, and $g_2$ becomes larger than $g_0$ ($g_2 > g_0$), so that the sensor sensitivity can be reduced from that for the initial gap $g_0$ and so that the input acceleration range can be wider.

In this embodiment, a combination of the potential $V_1$ and the Gnd (ground) potential is used for the application of voltage to the fixed electrodes, by way of illustration. However, any desired combination of each drive unit potential and each fixed electrode potential may be used without limitation. The gap between the sensing electrode and the movable mass member can be adjusted to the desired value by total control of the generated electrostatic attraction.

Description will be given of an example of the method of calibrating the sensor sensitivity and an example of the way to regulate the voltage applied to each fixed electrode. The calibration of the sensor sensitivity is a process of electrically matching, to each other, a pair of gaps formed between the movable mass member and the pair of sensing electrodes, respectively. When no inertial force is exerted, the amount of the displacement u of the movable mass member is 0, and thus with respect to the zero point output of the sensor (offset output), the formula $V_{out} = V_s/2$ is ideally established from Formulae (1) and (2).

In this embodiment, for example, some voltages ($0 < V_1 < V_2 < V_3 \ldots$) are applied to one fixed electrode 55*a* of the drive unit 5A in the sensor element. Voltage control may then be so performed on the fixed electrode 55*b* of the drive unit 5B that the offset output value can be equal to $V_s/2$ at each time of voltage application. In this process, the voltage to the fixed electrode 55*b* is modulated while the value of the sensor output $V_{out}$ is compared with $V_s/2$. When the sensor output $V_{out}$ is higher than $V_s/2$, the voltage to the fixed electrode 55*b* is increased. Through such a process, the offset voltage is set at $V_s/2$ when voltage is applied to the fixed electrodes 55*a* and 55*b*. The fixed electrodes 56*a* and 56*b* are set at the Gnd potential. Thus, each voltage to be applied to the fixed electrode 55*b* ($V_1'$, $V_2'$, $V_3'$ . . . ), at which the offset output can be set at $V_s/2$, is determined, depending on each voltage ($V_1$, $V_2$, $V_3$ . . . ) applied to the fixed electrode 55a. The pairs of the voltages ($V_1$, $V_1'$), ($V_2$, $V_2'$) ... correspond to the gaps $g_1$, $g_2$ ... as set, respectively, and also correspond to the sensor sensitivities $S_1$, $S_2$ ..., respectively.

Thereafter, any desired standard acceleration may be applied to the sensor, using a shaker or gravitational acceleration, and then the output voltage is checked, or electrical gain is modulated, before the calibration of the sensor sensitivity is completed. Such a series of voltage application information and the corresponding sensitivity (mV/G) information are electrically written to EPROM during the sensor calibration. Based on the written information, the user of the sensor can digitally call the desired sensitivity later.

In a case where the movable mass member is displaced toward one of the sensing electrodes by static gravitational acceleration, any method similar to the above calibration method may be used to determine the voltage to be applied to the fixed electrodes, in order that the pair of gaps between the movable mass member and the sensing electrodes can be equal to each other, namely, the offset output can be adjusted to a specific value ($V_s/2$). In general, non-linearity of the sensor output increases with the rate of displacement. When the offset output is controlled to the specific value ($V_s/2$), however, the gaps between the movable mass member and the sensing electrodes can be equal to each other. Thus, non-linearity of the sensor output can constantly be kept low with respect to any acceleration to be measured other than gravitational acceleration.

Second Embodiment

Figure 15:
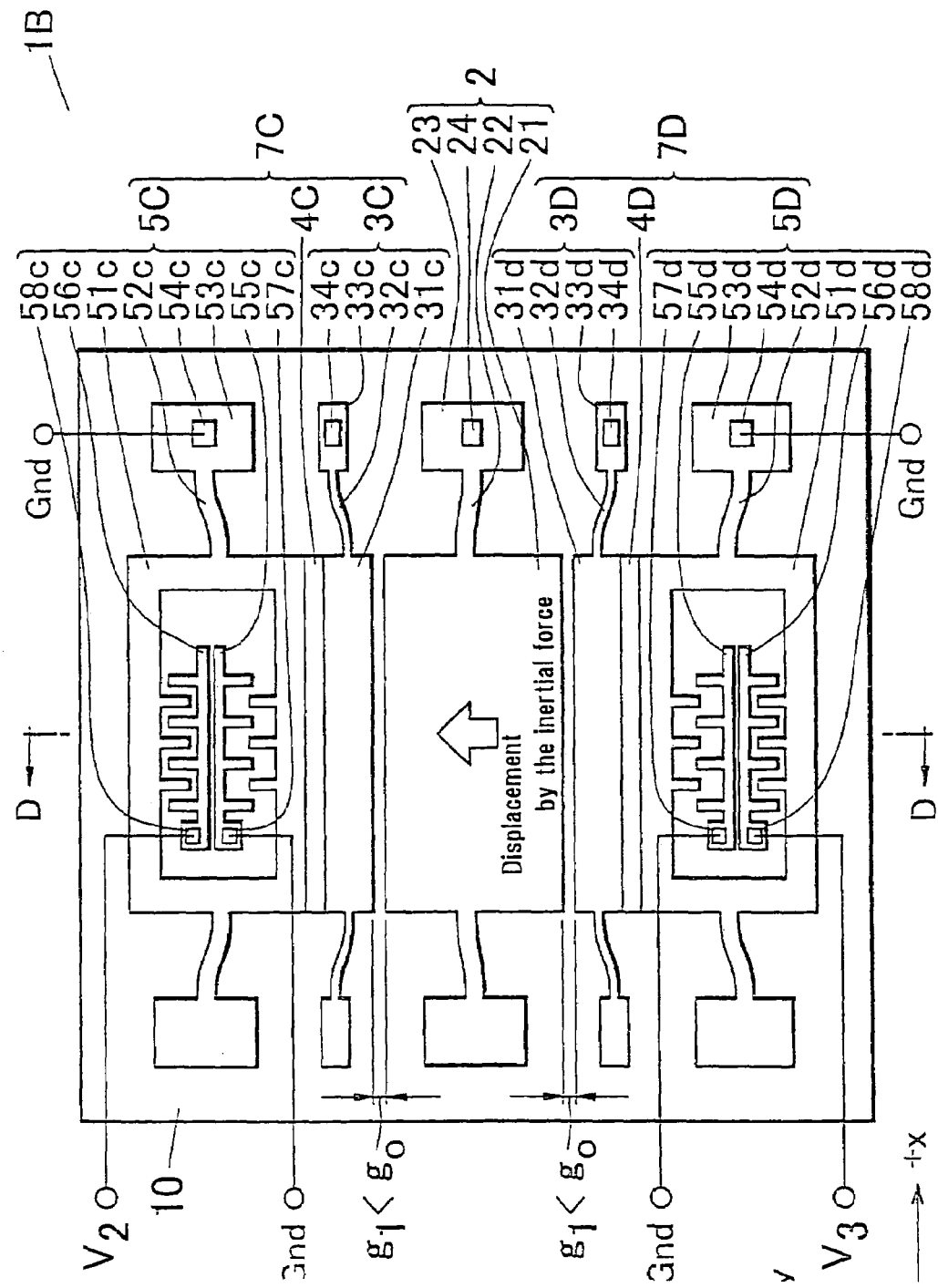
FIG. 15 is a schematic plan view showing a structure of a sensor element 1B for a sensor according to a second embodiment of the invention.
Figure 16:
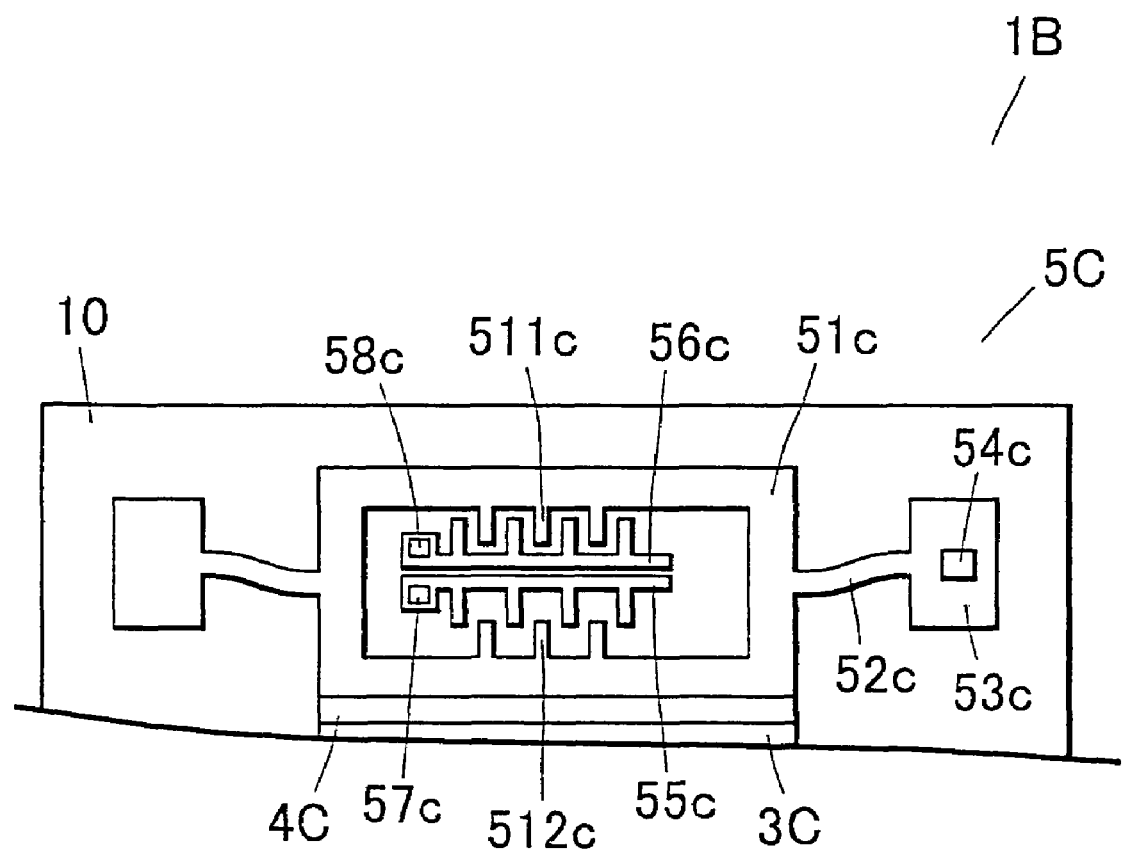
FIG. 16 is a partially enlarged plan view showing the structure of the sensor element of FIG. 15.
Figure 17:
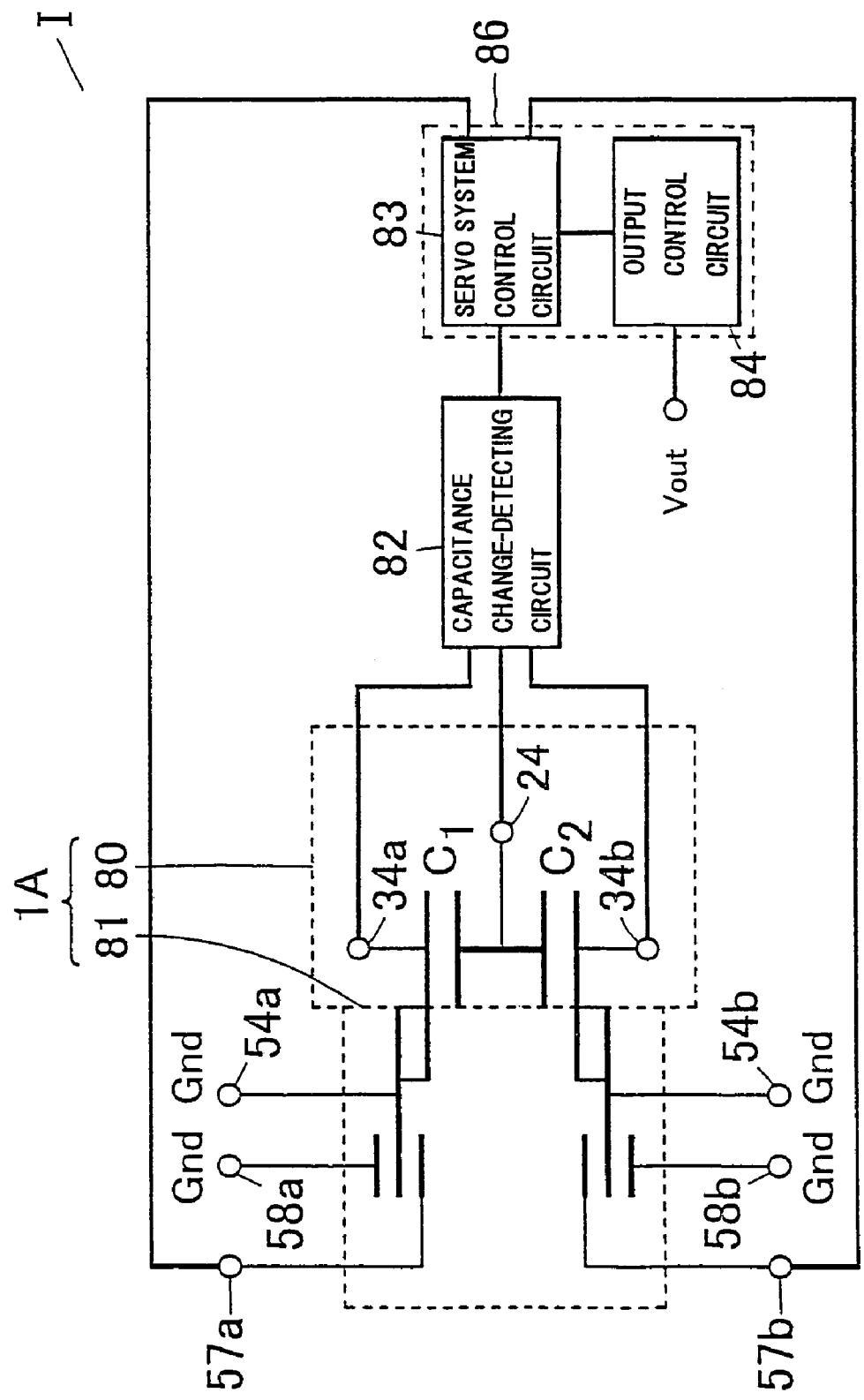
FIG. 17 is a schematic diagram showing the configuration of the sensor according to the second embodiment of the invention.

FIG. 15 is a plan view showing the structure of a sensor element 1B for a sensor according to this embodiment; FIG. 16 is a partially enlarged plan view showing the structure of a drive unit 5C of the sensor element 1B; and FIG. 17 is a schematic diagram showing the configuration of a sensor I using the sensor element 1B.

The sensor element of the first embodiment as shown in FIG. 1 has a pair of fixed electrodes, which includes flat plate electrodes arranged in parallel, and a drive electrode (Gnd potential), in the drive unit. In such a case, electrostatic attraction generated between the drive electrode and the pair of fixed electrodes can be reversely proportional to the square of the gap; thus, the relationship between the displacement and the potential difference between the electrodes can be non-linear. In addition, a large displacement can cause a sticking phenomenon between the fixed electrode and the drive electrode. Therefore, for example, the drive unit may be a comb-shaped drive unit as disclosed in FIG. 1 of P. G. Harwell et al., "Single Mask Lateral Tunneling Accelerometer", IEEE, Micro Electro Mechanical System Symposium, p340–344, 1998 (MEMS98). In such a comb-shaped electrostatic drive unit, the potential difference between the fixed electrode and the drive electrode has a linear relationship with the displacement of the drive unit. When the calibration is performed, therefore, the potential of the fixed electrode has a linear relationship with the sensitivity, and thus the calibration data can easily be handled. Such a structure also has a merit that the pull-in phenomenon can hardly occur, which could otherwise occur at flat plate electrodes arranged in parallel.

The sensor element according to this embodiment may have the same structure as that of the sensor element 1A according to the first embodiment, except that the drive unit includes: a pair of comb-shaped electrodes as the fixed electrodes; and comb-shaped projections, which are provided on the drive electrode and placed opposite to the comb-shaped electrodes with a gap provided between each projection and each comb-shaped electrode. Specifically, in a drive unit 5C, comb-shaped projections 511c and 512c of a drive electrode 51c are provided opposite to comb-shaped fixed electrodes 56c and 55c, respectively, each with a gap provided between them. Also in a drive unit 5D, comb-shaped projections of a drive electrode 51d are provided opposite to comb-shaped fixed electrodes 56d and 55d, respectively, each with a gap provided between them.

In such a structure, voltage is applied to the fixed electrodes by the method as shown in FIG. 12. Specifically, terminals 54c and 54d of the drive units 5C and 5D are connected to electrical Gnd (ground), respectively; a terminal 58c in connection with the comb-shaped fixed electrode 56c is connected to a voltage source $V_2$; a terminal 58d in connection with the comb-shaped fixed electrode 56d is connected to a voltage source $V_3$; and terminals 57c and 57d in connection with the comb-shaped fixed electrodes 55c and 55d, respectively, are connected to Gnd. The gap between the sensing electrode and the movable mass member may be set at an initial gap $g_1$ (which is smaller than the initial gap $g_0$ at the time of manufacture of the sensor ($g_0 > g_1$)). Such a smaller initial gap can produce higher sensor sensitivity.

In this embodiment, when the movable mass member is displaced by inertial force, the amount and direction of the displacement are detected by means of the differential capacitance change-detecting circuit, and the sensing electrode is allowed to move in such a direction that the gap will not change between the sensing electrode and the movable mass member. Thus, the gap between the sensing electrode and the movable mass member can be kept constant. In the example shown in FIG. 15, when the movable mass member is displaced in the +y direction, voltages $V_2$ ($V_1 - \Delta V$) and $V_3$ ($V_1 + \Delta V$) ($V_2 < V_3$) are applied to the terminals 58c and 58d, respectively, to displace the respective sensing electrodes by the same amount as that of the movable mass member, so that the gap between each sensing electrode and the movable mass member is kept at the initial gap $g_1$. The voltage applied to each terminal is not limited to that as shown in FIG. 15. For example, the Gnd potential for the corresponding terminal may be replaced with any other potential.

Referring to FIG. 17, in the sensor I according to this embodiment, a differential capacitance change-detecting circuit 82 detects a capacitance change in the sensor element 1A. In response to the input from the differential capacitance change-detecting circuit 82, a servo system control circuit 83 constituting a feedback mechanism 86 outputs a voltage, which is applied to each fixed electrode terminal. The feedback mechanism 86 applies a voltage to the drive unit to allow the sensing electrode to move, in such a manner that after the displacement, the gap between the movable mass member and the sensing electrode can return to the original value, which is previously set before the displacement. The servo system control circuit 83 has a PID control function so as to control the phase or gain of the input and output of the main control circuit. The output voltage may also be a very small output of the differential capacitance change-detecting circuit 82. However, the output voltage is servo-controlled so as not to be changed; thus, it is preferred to use a directly manipulated variable, a feedback voltage formed in the servo system control circuit 83. The feedback voltage may be processed by the following output control circuit 84 so that the output or the zero point output is controlled and set with respect to the desired acceleration, for example, in a digital manner.

In the sensor I according to this embodiment, the gap between the movable mass member and the sensing electrode is kept constant in principle. Therefore, the sensor has a significant advantage that degradation in linearity of the sensor output can be prevented in principle, which could otherwise occur in a conventional sensor when the displacement of the movable mass member is large relative to the gap. Even in a case where the initial gap is set narrow for the purpose of increasing the sensitivity, the sensor can advantageously be less susceptible to collision or sticking between the electrodes and less susceptible to damage to the sensor structure caused thereby, thus a wide measurement range acceleration sensor can be realized.

In a servo-type acceleration sensor, which positively uses an electrical spring constant, if the gap is variable in the structure, the electrical spring constant can be improved. It is because a smaller gap can produce a stronger electrostatic attraction even at the same potential difference between the electrodes. Thus, the bandwidth of the sensor can be widened, which would otherwise be restricted by the limit (upper limit) of the power supply for the conventional servo system circuit. On the other hand, this means that the sensitivity can be increased when the bandwidth is designed to be kept constant.

Alternatively, the detection circuit may be a charge balance type as used in the sensor of the first embodiment. In such a case, the electrostatic attraction can constantly be balanced between the electrodes, and thus the sensor can advantageously be less susceptible to the pull-in phenomenon.

In this embodiment, even when the movable mass member is displaced by inertial force, the sensing electrode is allowed to move by the drive voltage output from the servo system control circuit so that the initial gap can be retained. In such a case, it is preferred that the initial gap $g_1$ before the displacement should be set smaller than the initial gap $g_0$ at the time of manufacture. It is because such a smaller initial gap can produce a stronger electrostatic attraction between the sensing electrode and the movable mass member so that the drive voltage applied to the sensing electrode can be low even when the movable mass member is displaced.

Third Embodiment

Figure 18:
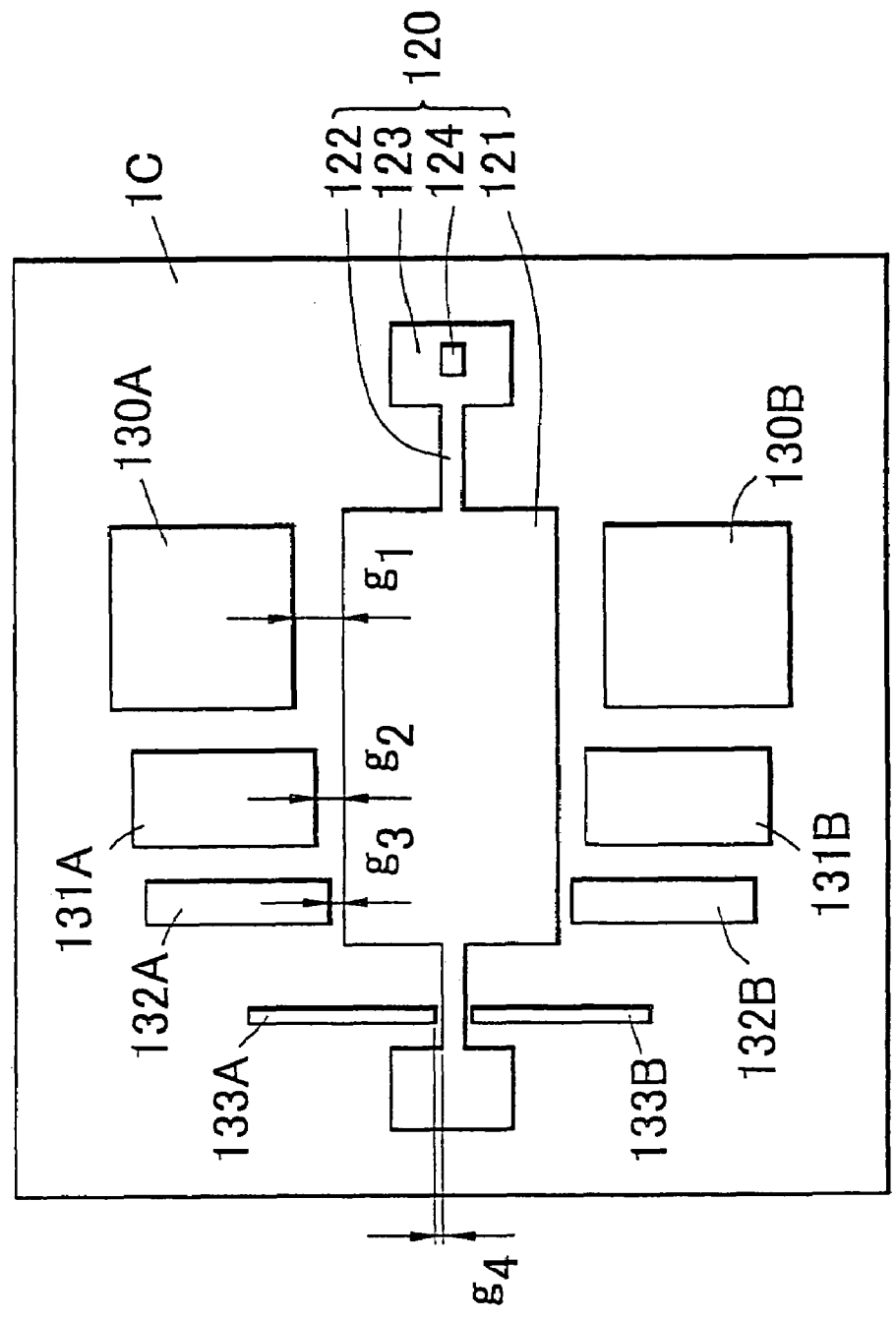
FIG. 18 is a schematic plan view showing the configuration of a sensor element for a sensor according to a third embodiment of the invention.

FIG. 18 is a schematic plan view showing the structure of a sensor element 1C for a sensor according to this embodiment. The sensor element 1C may have the same structure as that of the sensor element 1A of the first embodiment, except that it has plural pairs of detection units in place of a pair of detection units. Referring to FIG. 18, the sensor element 1C includes a displaceable unit 120 and four pairs of detection units including first detection units 130A and 130B, second detection units 131A and 131B, third detection units 132A and 132B, and fourth detection units 133A and 133B, arranged on a substrate. The displaceable unit 120 includes a movable mass member 121 displaceable in the direction of inertial force, a pair of beams 122 which are each connected to the movable mass member 121 to support the member 121 in a space over the gap, a pair of anchors 124 which support the beams and are bonded to the substrate, and a terminal 123. The four pairs of detection units are arranged opposite to the displaceable unit and form the same or different gaps together with the movable mass member, respectively, wherein the first to third detection units are placed opposite to the movable mass member 120, and the fourth detection unit 133 is placed opposite to the beam 122. Each detection unit may have the same structure as that of the detection unit 7A or 7B described in the first embodiment, and such a structure is not shown in FIG. 18.

According to this embodiment, the four pairs of detection units are positioned and arranged so as to be separated by different gaps from the displaceable unit and opposite to the displaceable unit, wherein a detection unit having a measurement range suitable to the actual acceleration and having a suitable initial capacitance $C_0$ can be selected. For example, when the acceleration measurement range is sifted to a low range (the sensitivity is increased), sensing electrodes forming a certain initial capacitance suitable to the low measurement range is used so that more stable measurement is possible in terms of avoiding the problem with the detection circuit stability.

In the structure having a pair of detection units, the sensitivity can be increased, if the initial gap is made small with the opposite electrode areas kept constant. However, the reduction in the initial gap can produce a significant increase in the initial capacitance. In such a case, unnecessary capacitances can be increased to affect the measurement circuit system, while there is a merit that the stray capacitance has less influence because of the reduction in the initial gap.

The detection unit placed opposite to the beam for supporting the movable mass member in a space can also provide a broader range of choices of measurement ranges. When acceleration is applied to the whole structure, the beam is less displaced than the mass member. In particular, the displacement of the portion closer to the fixed end of the beam can be smaller. Thus, the above structure can provide a broader range of choices of displacements of the movable mass member per unit of acceleration.

In this embodiment, a damper portion may be formed in which sensing electrodes of at least one of the pairs of detection units form a gap narrower than those formed by the electrodes of the remaining detection units. In such a structure, the damper portion may come into contact with the displaceable unit before the sensing electrodes of the remaining units come into contact with the displaceable unit. If impact acceleration beyond the measurement range is input to the sensor element of a capacitive acceleration sensor by some cause, the movable mass member of the displaceable unit can collide with the sensing electrode to cause electrode breakage, and in some cases, the sensor element can fail to operate. Against such a problem, the damper portion including at least one of the detection units can absorb the shock when the movable mass member collides, so that the displacement of the movable mass member can be restricted. Thus, if impact acceleration beyond the measurement range is applied to the sensor element, the impact can be prevented from breaking the sensor element. In a preferred mode, the detection unit of the damper portion has a gap smaller than the maximum gap of the pairs of detection units.

Fourth Embodiment

Figure 19:
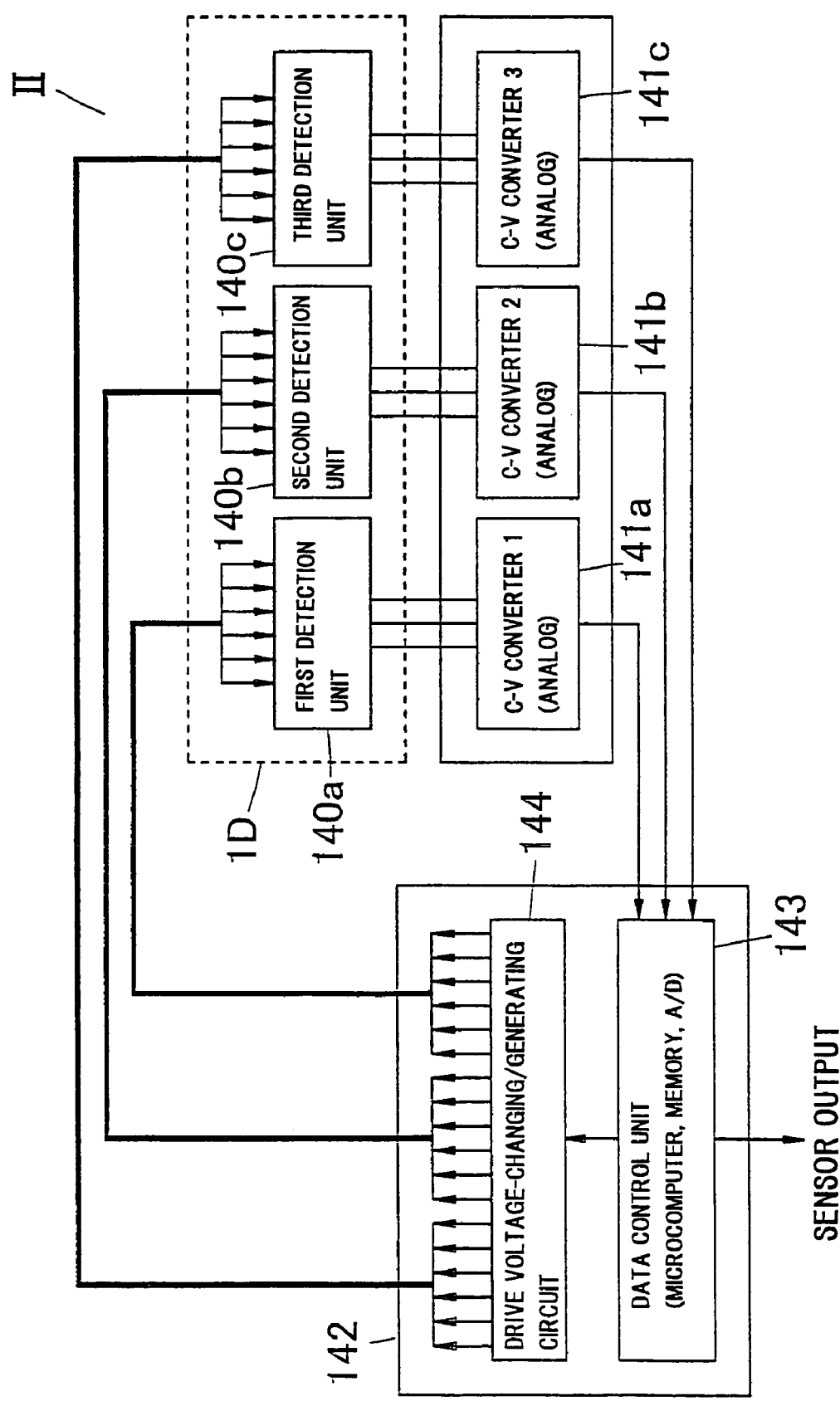
FIG. 19 is a schematic diagram showing the configuration of a sensor according to a fourth embodiment of the invention.

FIG. 19 is a schematic view showing an example of the structure of a sensor according to this embodiment. In the sensor according to this embodiment, the sensor element includes: plural pairs of detection units having different gaps, whereby different measurement ranges are provided; and an automatic range-changing mechanism which compares the output voltage of the sensor element with a measurement range-defining threshold voltage(s) for a specific time period to select a detection unit having a threshold voltage higher or lower than the output voltage, wherein an optimal measurement range can be selected from moment to moment according to the time history of the input acceleration. Specifically, the sensor element 1D includes: plural pairs of detection units including first, second and third detection units 140a, 140b and 140c. The respective changes in capacitance of the detection units are converted into voltages by C-V converters 141a, 141b and 141c, respectively, and each voltage is transmitted to an automatic range-changing mechanism 142 that includes: a data control unit 143 having a microcomputer, a memory and an A/D converter unit; and a drive voltage-changing/generating circuit 144. The automatic range-changing mechanism 142 selects a detection unit having a measurement range suitable for the input acceleration measurement based on the changes in capacitance of the pairs of detection units and outputs a measured value from the selected detection unit. The drive voltage-changing/generating circuit of the automatic range-changing mechanism has the function of setting the initial gap at a specific value for each of the pairs of detection units. FIG. 19 shows three pairs of the detection units by way of illustration, but any other plural pairs may also be used.

Figure 20:
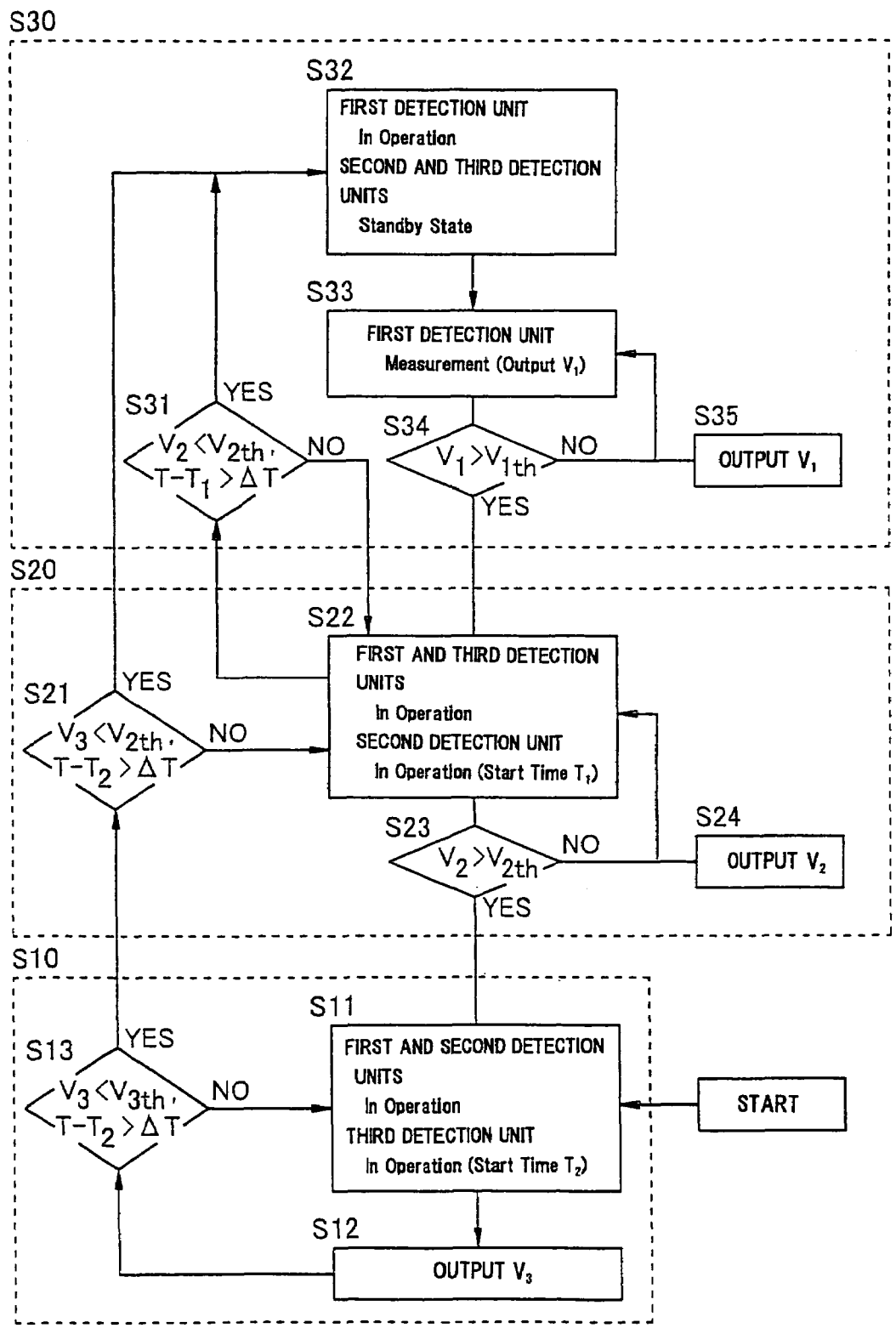
FIG. 20 is a flowchart showing a procedure performed in the sensor according to the fourth embodiment of the invention.
Figure 21:
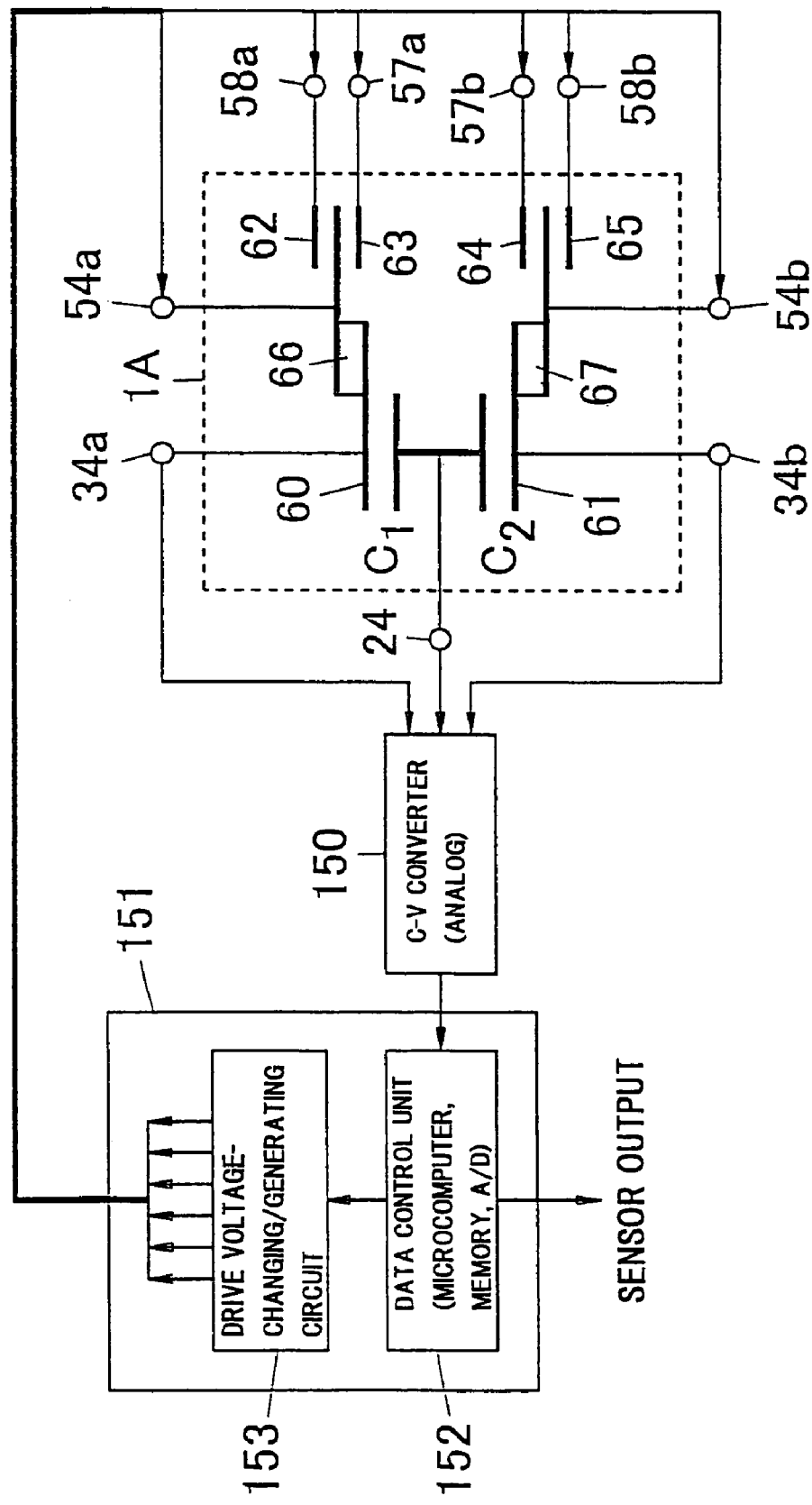
FIG. 21 is a schematic diagram showing the configuration of a sensor according to a fifth embodiment of the invention.

FIG. 20 is a flowchart showing an example of the procedure performed in the sensor of FIG. 21. As shown in FIG. 20, the three pairs of detection units have three measurement ranges from high to low range in the order of third>second>first. The procedure includes a first processing flow S10 for measurement in the third detection unit, a second processing flow S20 for measurement in the second detection unit, and a third processing flow S30 for measurement in the third detection unit.

When acceleration is input, measurement is started in the third detection unit having a highest measurement range (first range setting S11). At this time, the third detection unit has a gap for measurement, which is smaller than the gap in the standby state. On the other hand, the first and second detection units are in the standby state with no measurement. The output from the third detection unit is output as a voltage $V_3$ through an output unit 3 until a specific time $\Delta T$ elapses from the measurement start time T2 (first output processing S12). During the first measurement process, the output voltage $V_3$ from the output unit 3 is compared with a threshold voltage $V_{3th}$, and if the output voltage $V_3$ is higher than the threshold voltage $V_{3th}$, the measurement is continued according to the first measurement processing S11; if $V_3$ is lower than $V_{3th}$, the measurement range is changed to a middle or low range (first decision processing S13).

The output voltage $V_3$ is also compared with a threshold voltage $V_{2th}$ of the second detection unit having a middle measurement range. If the output voltage $V_3$ is higher than the threshold voltage $V_{2th}$ and such a state lasts for a certain time period $\Delta T$, the detection unit is changed to the second unit having a middle measurement range; If $V_3$ is smaller than $V_{2th}$ and such a state lasts for $\Delta T$, the measurement range is changed to the low range of the first detection unit (second decision processing S21).

When the measurement range is changed to the low range, the second and third detection units are put into a standby state, while the gap is changed from the standby gap to the measurement gap in the first detection unit so that measurement is started (third range setting S32). While the measurement is continued in the first detection unit (measurement processing S33), its output voltage $V_1$ is compared with the threshold voltage $V_{1th}$ of the first detection unit. If $V_1$ is higher than $V_{1th}$, the measurement range is changed to the middle range; If $V_1$ is lower than $V_{1th}$, the measurement in the low range is continued (third decision processing S34), and its voltage $V_1$ is output (third output processing S35).

On the other hand, when the measurement range is changed to the middle range, the first and third detection units are put into a standby state, while the gap is changed from the standby gap to the measurement gap in the second detection unit so that measurement is started (second range setting S22). Its output voltage $V_2$ is compared with the threshold voltage $V_{2th}$ of the second detection unit as to whether the former is higher or lower than the latter. If $V_2$ is higher than $V_{2th}$, the measurement range is changed to a high range; If $V_2$ is lower than $V_{2th}$, the measurement is continued in the middle range (fourth decision processing S23), and the voltage $V_2$ is output (fourth output processing S24).

If $V_2$ is lower than $V_{2th}$ and such a state lasts for a time period of $\Delta T$ or more from the measurement start time $T_2$, the measurement range is changed to the low range (fifth decision processing S31).

As described above, the sensor according to this embodiment has a plurality of detection units different in measurement range, wherein a detection unit having a measurement range suitable for the measured acceleration is automatically selected. Thus, acceleration varying from moment to moment can be measured with high accuracy.

Fifth Embodiment

FIG. 21 is a schematic diagram showing the configuration of a sensor according to this embodiment. The sensor element of the sensor according to this embodiment may use a pair of detection units as used in the first embodiment in place of the pairs of detection units as used in the fourth embodiment. The sensor element includes: a pair of detection units which can have different measurement ranges through the step of changing the sensing electrode gap in a stepwise manner; and an automatic range-changing mechanism which compares the output voltage of the sensor element with a measurement range-defining threshold voltage for a specific time period to change the measurement range through the step of changing the gap in such a manner that it will have a threshold voltage smaller than the output voltage. Specifically, the sensor includes the sensor element 1A having a pair of detection units, a C-V converter circuit 150, and a automatic range-changing mechanism 151 which automatically selects a range for measurement based on the voltage information from the C-V converter circuit 150. The automatic range-changing mechanism 151 includes: a data control unit 152 having a microcomputer, a memory and an A/D converter; and a drive voltage-changing/generating circuit 153 which drives each detection unit based on the signal from the data control unit 152. The sensor element uses the structure of the first embodiment, but any other structure having a pair of detection units may be used.

In the sensor of this embodiment, the threshold voltage, which is set corresponding to each measurement range, is compared with the output voltage from the sensor element as to whether the former is higher or lower than the latter, and the gap is changed in a stepwise manner so as to produce a measurement range suitable to the output voltage. Thus, a suitable measurement range can be selected depending on the magnitude of acceleration, and acceleration varying with time can also be measured with high accuracy. Since the opposed areas are constant, the present sensor has a narrower measurement range than that of the fourth embodiment. However, the present sensor can have simple structures of the sensor element and the drive circuit and thus have a high degree of flexibility in design.

Sixth Embodiment

Figure 22:
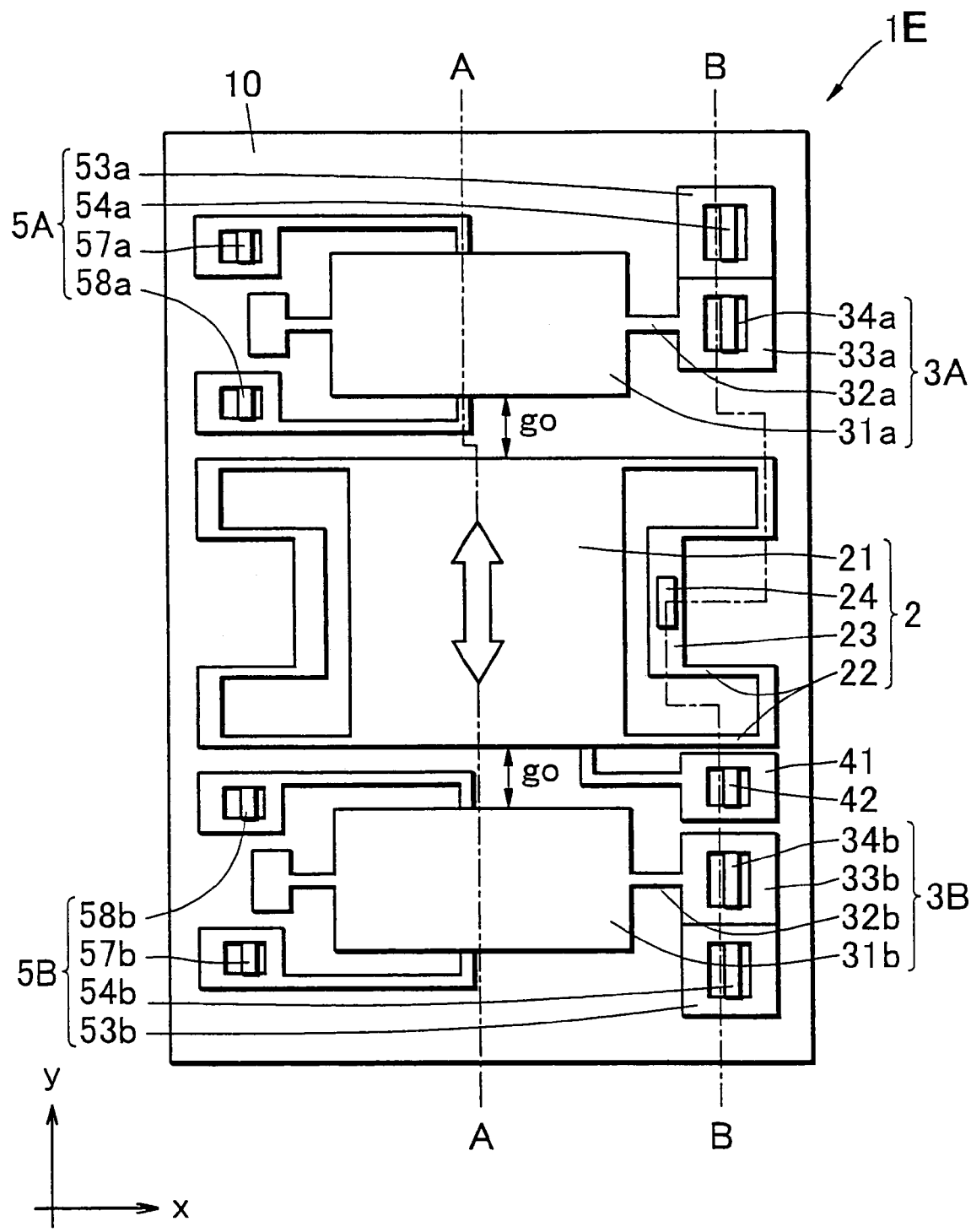
FIG. 22 is a schematic plan view showing a structure of a sensor element for a sensor according to a sixth embodiment of the invention.
Figure 23:
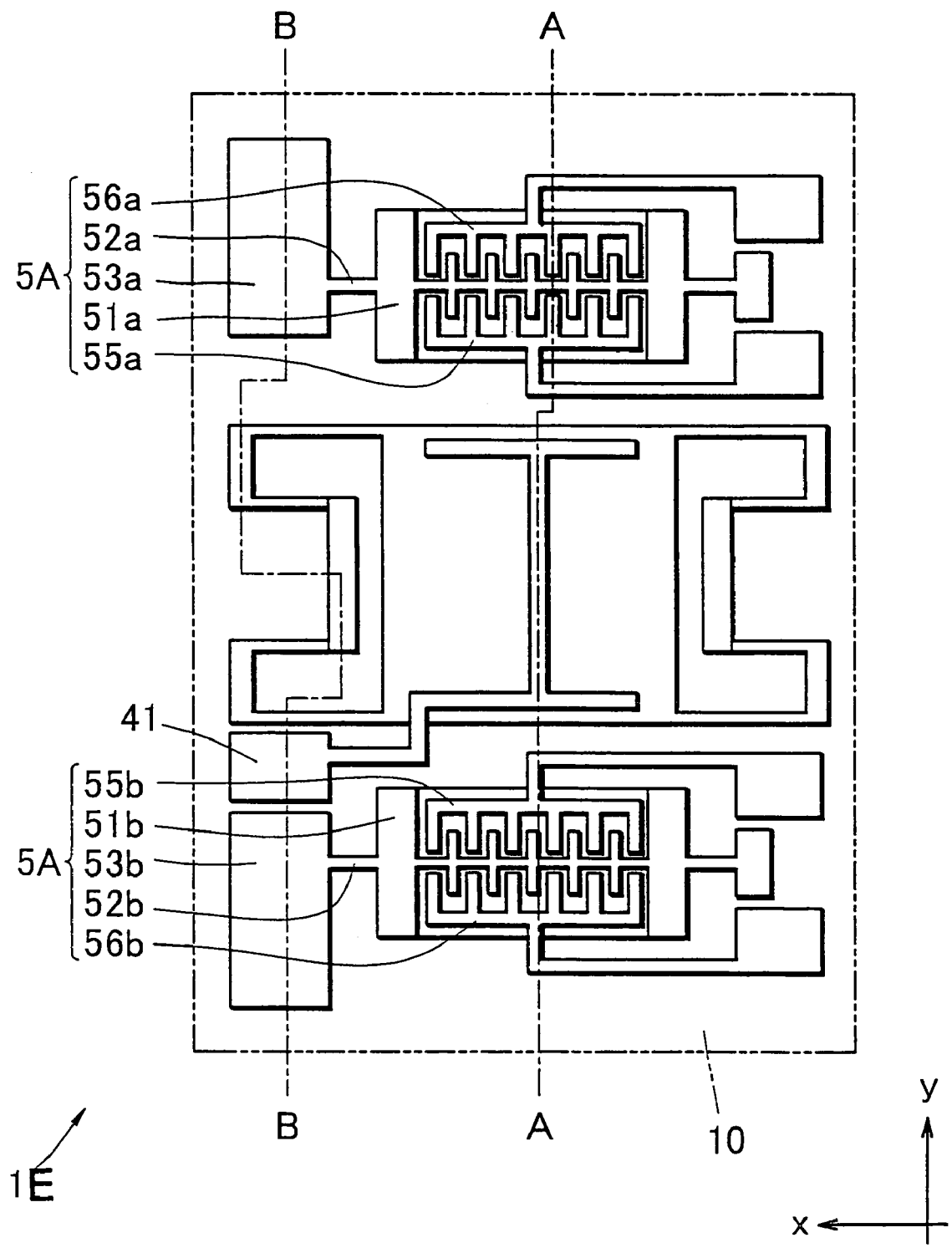
FIG. 23 is a schematic plan view of the backside structure of the sensor element of FIG. 22.
Figure 24:
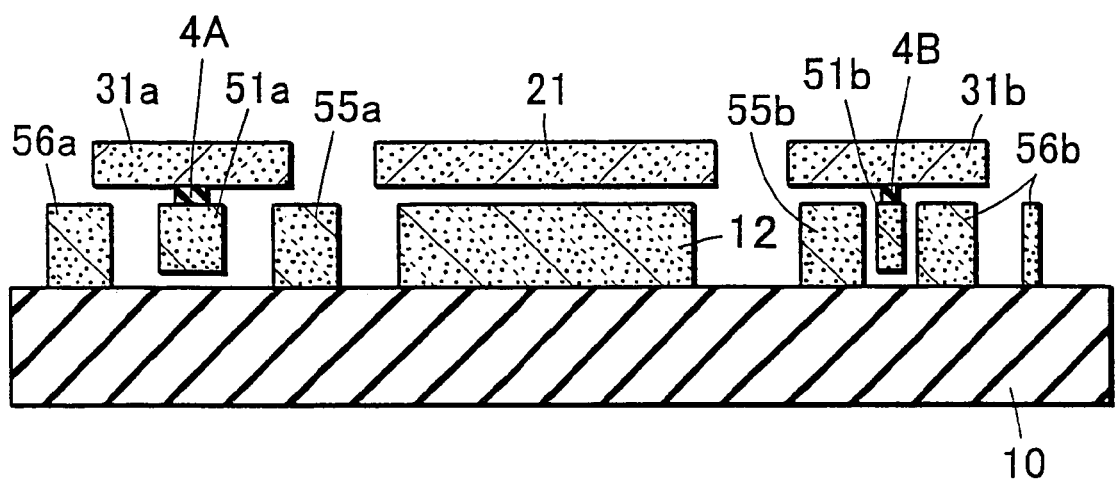
FIG. 24 is a schematic cross sectional view of the sensor element of FIG. 22 taken along line A—A of FIG. 22.
Figure 25:
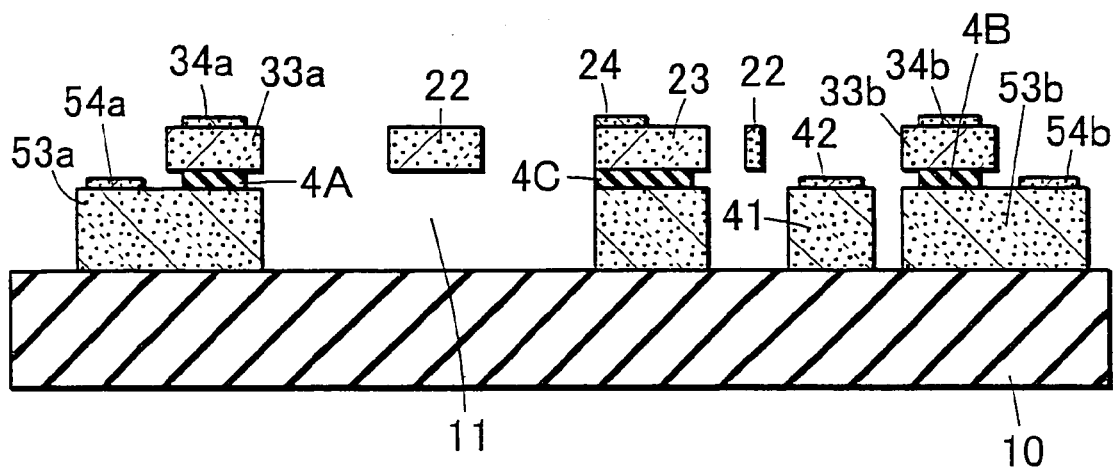
FIG. 25 is a schematic cross sectional view of the sensor element of FIG. 22 taken along the line B—B of FIG. 22.

The sensor according to this embodiment may use comb-shaped drive units each including comb-shaped electrodes in place of the drive units of the first embodiment. FIG. 22 is a schematic plan view showing the structure of a sensor element 1E for a sensor according to this embodiment; FIG. 23 is a schematic backside plan view of FIG. 23; FIG. 24 is a schematic A—A cross sectional view of FIG. 22; and FIG. 25 is a schematic B—B cross sectional view of FIG. 22. Referring to FIG. 22, the sensor element 1E includes a substrate 10, for example, having an electrically insulating layer at its surface, a displaceable unit 2 placed on the upper surface thereof, and a pair of detection units 3A and 3B, wherein the displaceable unit 2 is placed opposite to each of the pair of detection units 3A and 3B and separated by a specific gap from each of the detection units 3A and 3B. The substrate 10 may be a silicon substrate having an oxide film, a nitride film or the like at its surface, or an electrically insulating substrate such as a glass plate.

As shown in FIG. 22, the displaceable unit 2 includes a movable mass member 21 which is displaceable in the direction of inertial force, a pair of beams 22 and 22 which are each connected to the movable mass member 21 to support the member 21 in a space over a gap 11, a pair of anchors 23 and 23 which support the beams 22 and 22 and are each finally bonded to the substrate 10, and a terminal 24 formed on the surface of one of the anchors. In this embodiment, in response to inertial force, the movable mass member 21 is displaceable in the y-axis direction by bending elasticity of each beam 22 in the y-axis direction.

The structure of the pair of detection units 3A and 3B is described below by the illustration of the detection unit 3A. The detection unit 3A includes a drive unit 5A connected via an insulating layer 4A. In this structure, the side face of the detection unit 3A is separated by a specific gap $g_0$ from the side face of the movable mass member 21 and placed opposite to the side face of the movable mass member 21. As shown in FIG. 22, the detection unit 3A includes a sensing electrode 31a which is displaceable in the direction of inertial force, a pair of beams 32a and 32a which are each connected to the sensing electrode 31a to support the electrode 31a in a space over the gap 11, a pair of anchors 33a and 33a which support the beams 32a and 32a, and a terminal 34a formed on the surface of one of the anchors. As shown in FIG. 23, the drive unit 5A includes: a pair of fixed electrodes 55a and 56a arranged in the out-of-plane direction and fixed on the substrate 10; a drive electrode 51a which is bonded to the fixed electrodes 55a and 56a through the sensing electrode 31a and the insulating film 4A intervening therebetween and is movable in the horizontal y direction together with the sensing electrode; a pair of beams 52a and 52a which are each connected to the drive electrode 51a to support the electrode 51a in a space over the gap 11; a pair of anchors 53a and 53a which support the beams 52a and 52a and are bonded to the substrate 10; a terminal 54a formed on the surface of one of the anchors; and terminals 57a and 58a each formed on the surface of each of the fixed electrodes 55a and 56a. An anti-sticking stopper 12 may be also provided immediately below the movable mass member 21 on the substrate 10 to extend under the movable mass member 21 to a stopper electrode 41 having a terminal 42. The anti-sticking stopper 12 may be provided so as to restrict the displacement of the movable mass member 21 and to prevent a fracture of the member 21, which could otherwise be caused by large displacement and collision of the member 21 with the substrate 10. If the substrate 10 and the movable mass member 21 are at the same potential, sticking can effectively be prevented.

Figure 26A:
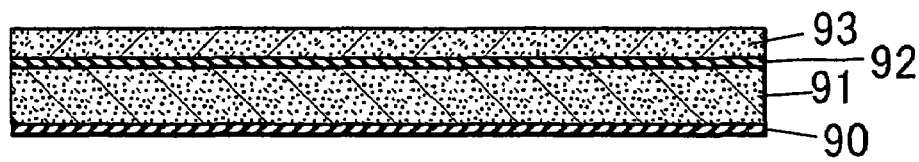
FIGS. 26A to 26H are schematic cross sectional views showing a method of manufacturing the sensor element of FIG. 22.

A method of manufacturing the sensor element is described with reference to the schematic cross sectional views of FIGS. 24 to 26A to 26H, which each correspond to an A—A cross sectional view of FIG. 22. First, an SOI (Silicon On Insulator) substrate is provided, which includes an active silicon layer 93 with low resistance, for example, about 40 $\mu$m in thickness; a silicon oxide film 92 about 1 $\mu$m in thickness formed under the layer 93; and a silicon substrate 91 similarly with low resistance, several hundred $\mu$m in thickness (FIG. 26A). A silicon oxide film 90 about 1 $\mu$m in thickness is also formed on the lower surface of the silicon substrate 91.

Figure 26B:
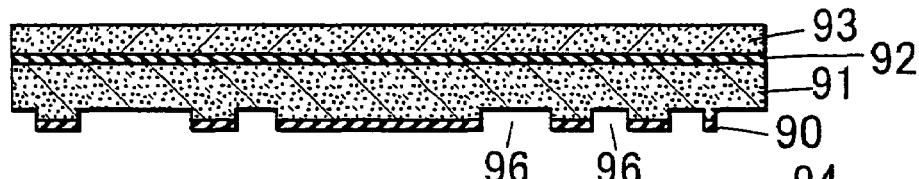
Figure 26C:
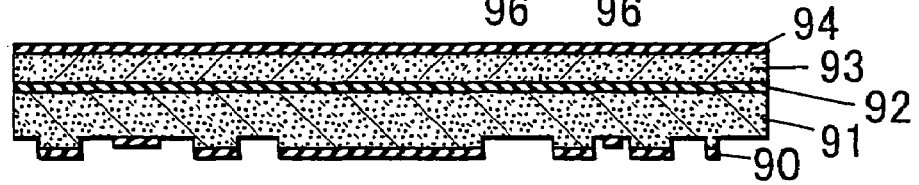
Figure 26D:
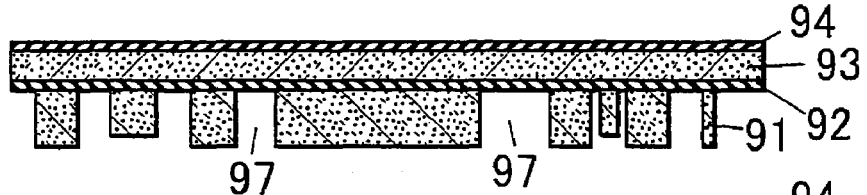

In order to form the movable regions and final etched through regions in the silicon substrate 91 as shown in FIG. 22, conventional resist photolithography and wet or dry etching are used to partially remove the silicon oxide film 90, and then the silicon substrate 91 under the film 90 is etched by ICP-RIE (Inductive Coupled Reactive Ion Etching) or the like to form trenches 96 (for example, about 5 $\mu$m in depth) (FIG. 26B). The oxide film is then once removed, and an oxide film about 1 $\mu$m in thickness is formed again on each side of the wafer by treatment in a thermal oxidation furnace or the like. Conventional resist photolithography and wet or dry etching are used to partially remove the silicon oxide film on the lower side of the silicon substrate (to form through regions in the silicon substrate by etching) (FIG. 26C). The silicon substrate 91 is then etched by ICP-RIE (Inductive Coupled Reactive Ion Etching) or the like to form trenches 97 (for example, about several hundred $\mu$m in depth) (FIG. 26D).

Figure 26E:
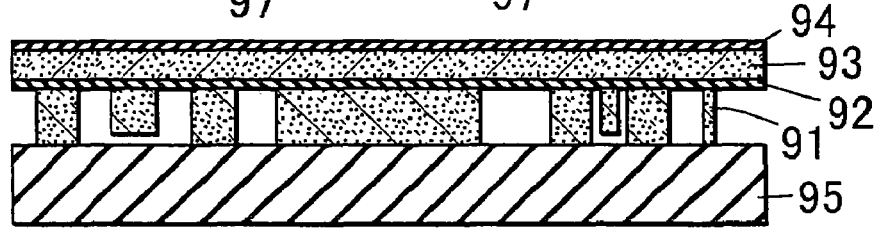

The substrate-side oxide film used for the trench etching is then only removed using hydrofluoric acid or the like, and a glass substrate 95 is bonded to the silicon substrate 91 by anodic bonding or the like (FIG. 26E). The glass substrate is used as an example, but alternatively, any silicon substrate having an insulating layer at its surface may be used, wherein the silicon substrates may be bonded by direct bonding, eutectic bonding (such as AuSi), or any of a variety of diffusion bonding (such as TiNi).

Figure 26F:
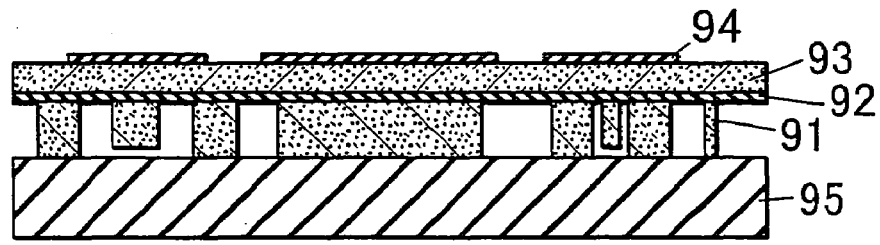

In order to form a structure of the active silicon layer, conventional photolithography is used to partially remove the oxide film on the active silicon layer side (FIG. 26F).

Figure 26G:
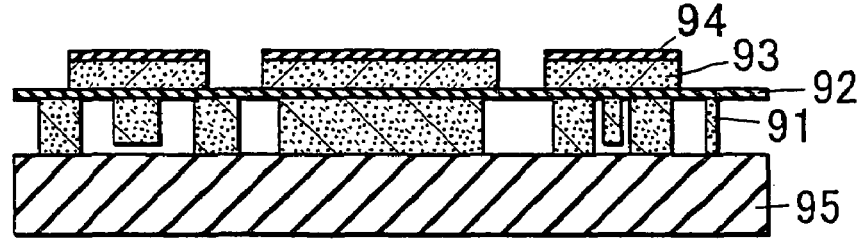
Figure 26H:
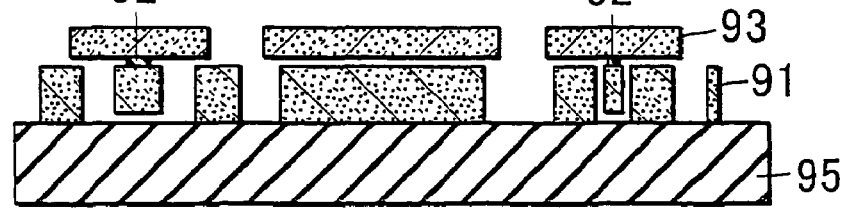

Through etching of the active silicon layer 93 is then performed by ICP-RIE (FIG. 26G). The silicon oxide film 92 is then partially removed by wet etching with hydrofluoric acid or the like to form component regions as shown in FIGS. 24 to 26 (FIG. 26H). Vapor deposition or sputtering of Cr, Au or the like is then performed with a shadow mask or the like to form electrode terminals.

Figure 27:
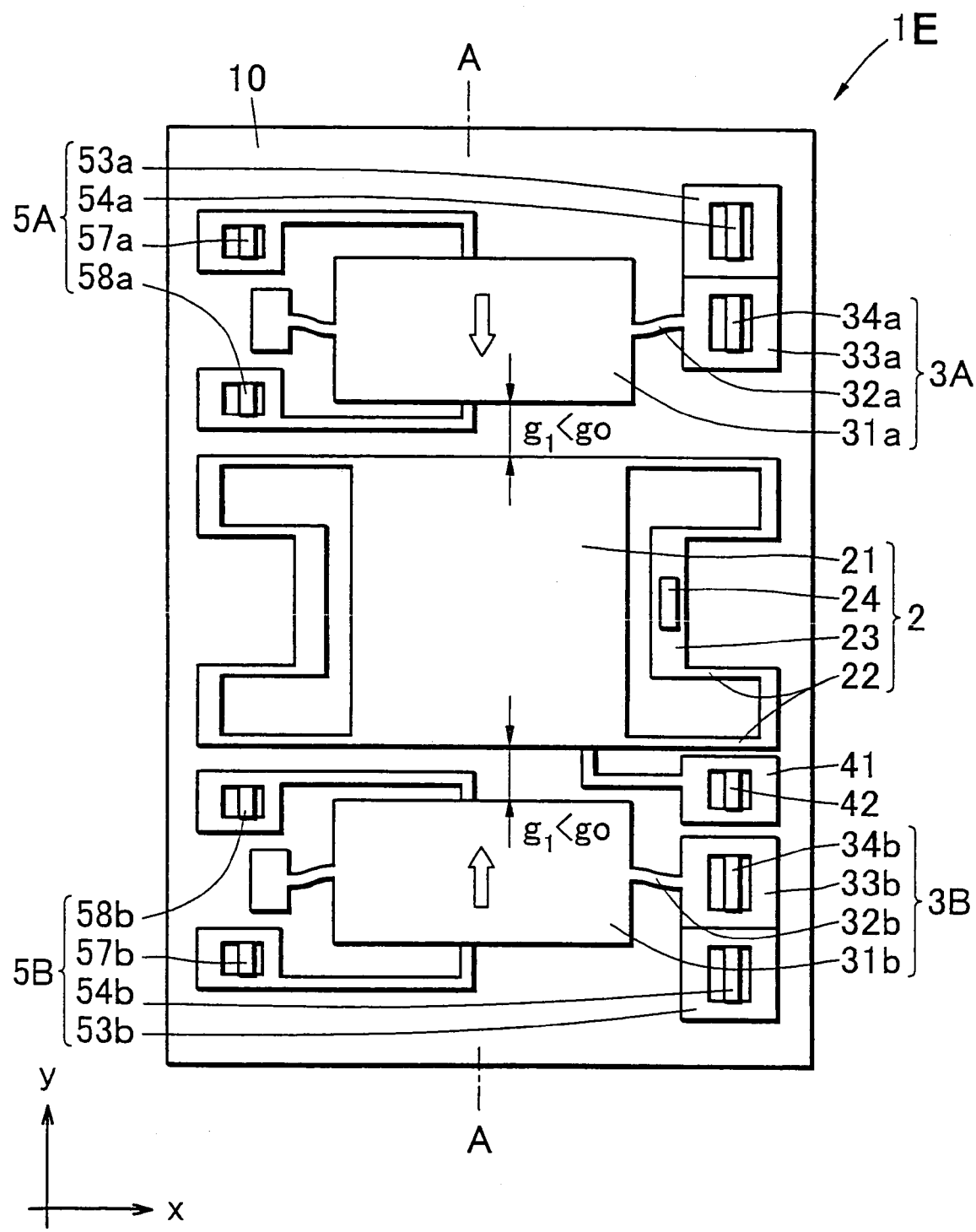
FIG. 27 is a schematic plan view showing the structure of the sensor element of FIG. 22 at the time when each detection unit moves toward the movable mass member.
Figure 28:
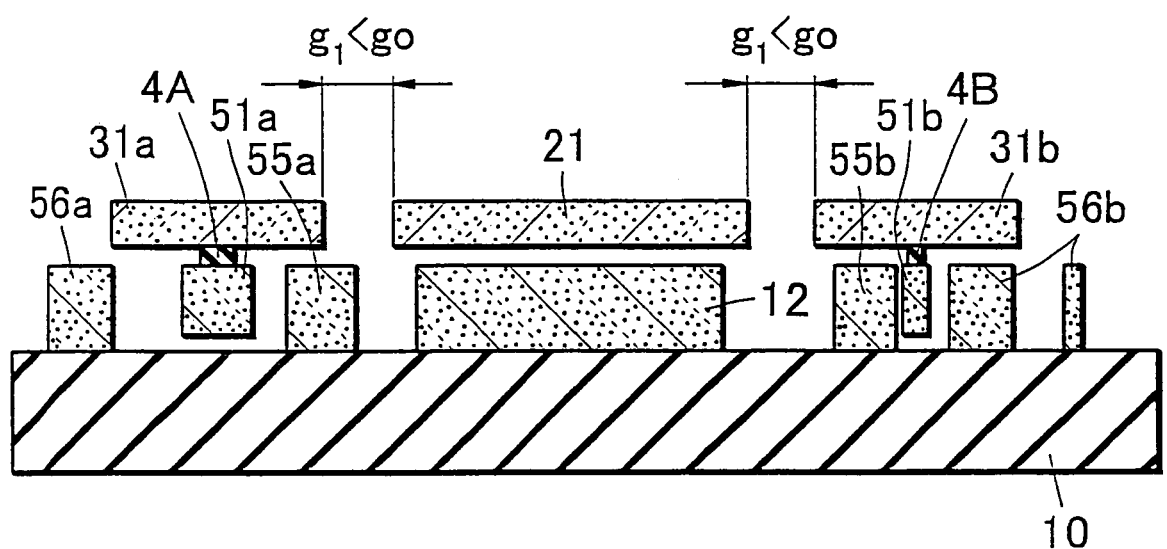
FIG. 28 is a schematic cross sectional view showing the structure of the sensor element of FIG. 22 when each detection unit moves toward the movable mass member.

In the sensor element 1E of this embodiment, the gap may also be changed by the method as described in the first embodiment. For example, the voltage application method as shown in FIG. 11 may be used to allow the detection unit 3A or 3B to move toward the movable mass member 21. FIG. 27 is a schematic plan view showing the state of the sensor element at the time when the detection units 3A and 3B are allowed to move toward the movable mass member 21; and FIG. 28 is a schematic A—A cross sectional view of FIG. 27.

In this embodiment, the comb-shaped drive units are used. Thus, the potential difference between the fixed electrode and the drive electrode can have a linear relationship with the displacement of the drive unit. When the sensor sensitivity is calibrated; therefore, the fixed electrode potential can have a linear relationship with the sensitivity, so that the calibration data can easily be handled. The sensor is also advantageously less susceptible to the pull-in phenomenon, which could otherwise occur in plate electrodes arranged in parallel.

Seventh Embodiment

Figure 29:
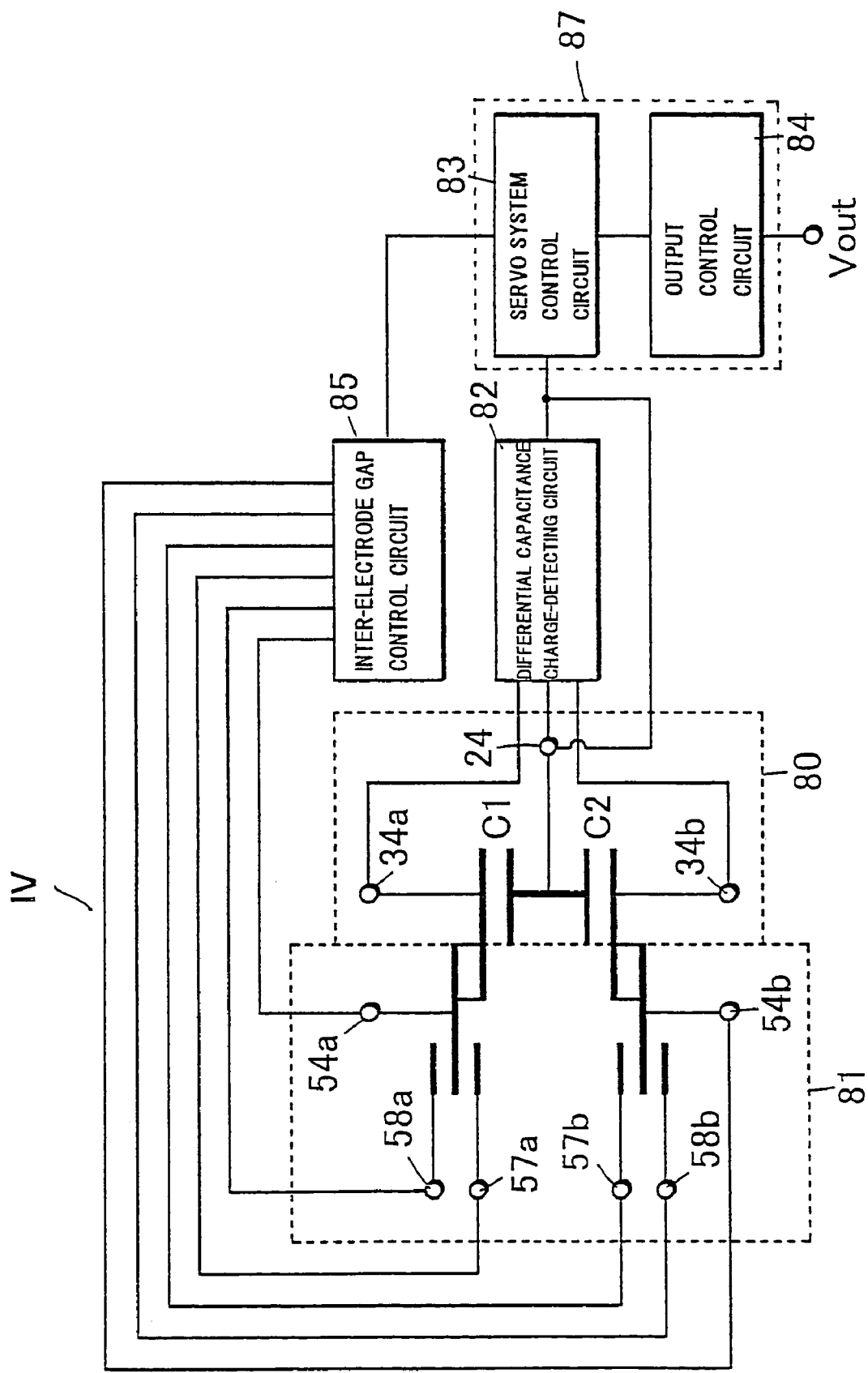
FIG. 29 is a schematic diagram showing a circuit configuration of a servo type acceleration sensor according to a seventh embodiment of the invention.

FIG. 29 is a schematic diagram showing an example of the configuration of a sensor IV according to this embodiment. This sensor may include any of the sensor elements as used in the first to sixth embodiments.

In the present sensor, voltage may be applied to the fixed electrodes of the sensor element by the same method as described with reference to FIGS. 27 and 28. Specifically, terminals 57a and 57b of the drive units 5A and 5B are connected to electrical Gnd (ground), respectively; a terminal 58a in connection with the comb-shaped fixed electrode 55a is connected to a voltage source $V_2$; a terminal 58b in connection with the comb-shaped fixed electrode 55b is connected to a voltage source $V_3$; and terminals 54a and 54b are connected to Gnd. The gap between each sensing electrode and the movable mass member is set at an initial gap $g_1$, which is smaller than the initial gap $g_0$ at the time of manufacture. Such a series of setting gaps is performed by means of an inter-electrode gap control circuit 85. As shown in the first embodiment; therefore, the initial gap is made small so that the sensor sensitivity can be increased.

As shown in FIG. 29, the present sensor has a feedback mechanism 87 including a servo system control circuit 83 for maintaining the gap between the sensing electrode and the movable electrode at a previously set value. When the movable mass member is going to be displaced by inertial force, the amount and the direction of the displacement are detected by the differential capacitance change-detecting circuit 82, and the servo system control circuit 83 of the feedback mechanism 87 determines the potential for the sensing electrode so as not to cause a displacement of the movable mass member (the specific technique is disclosed in Japanese Patent No. 3264884). Specifically, when the movable mass member is going to be displaced, a feedback voltage is applied from the servo system control circuit 83 to a terminal 24 to change the potential difference between the movable mass member and the sensing electrode, so that electrostatic attraction is exerted to cancel out the displacement of the movable mass member. Particularly when the initial gap $g_1$ is set smaller than the initial gap $g_0$ at the time of manufacture, stronger electrostatic attraction can be exerted between the movable mass member and the sensing electrode; thus, even a small potential difference can cancel out the displacement of the movable mass member. Therefore, the gap between the sensing electrode and the movable mass member can constantly be kept at a specific set value (actually, the displacement can be smaller than that under open loop control). The voltage applied to each terminal is not limited to that as described with reference to FIG. 11. For example, the Gnd potential for the corresponding terminal may be replaced with any other potential. The output voltage may be a very small output of the differential capacitance change-detecting circuit 82. However, the output voltage is servo-controlled so as not to be changed; thus, it is preferred to use a directly manipulated variable, a feedback voltage formed in the servo system control circuit 83. The feedback voltage is processed by the following output control circuit 84, so that the output or the zero point output is controlled and set with respect to the desired acceleration, for example, in a digital manner.

Even in such a servo-type acceleration sensor, which positively uses an electrical spring constant, if the gap is variable in the structure, the electrical spring constant and by extension the feedback loop gain can be improved. It is because as the gap decreases, the electrostatic attraction can increase in proportion to the square of its ratio even at the same potential difference between the electrodes. Thus, the bandwidth of the sensor can be widened, which would otherwise be restricted by the limit (upper limit) of the power supply for the conventional servo system circuit. On the other hand, this means that the sensitivity and the SN ratio can be increased when the bandwidth is designed to be kept constant.

Eighth Embodiment

Figure 30:
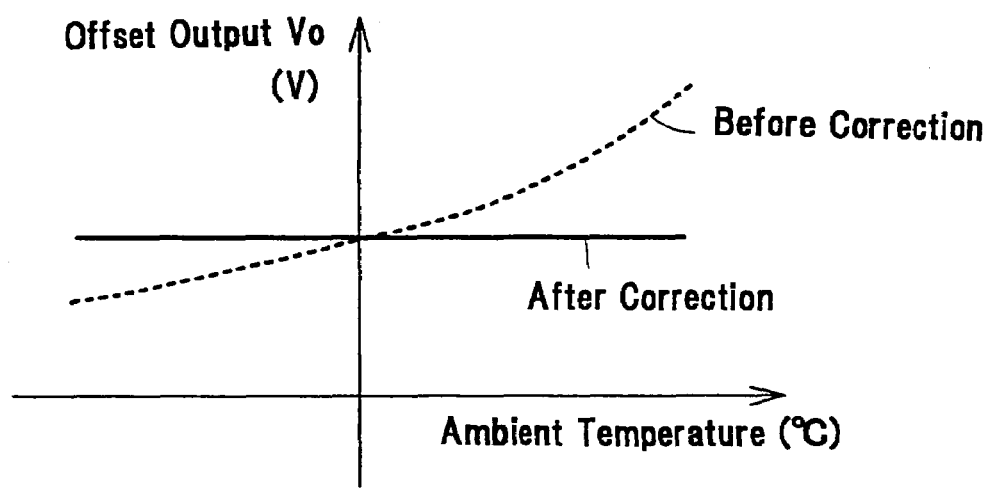
FIG. 30 is a schematic diagram showing a temperature dependency of an offset output $V_O$.
Figure 31:
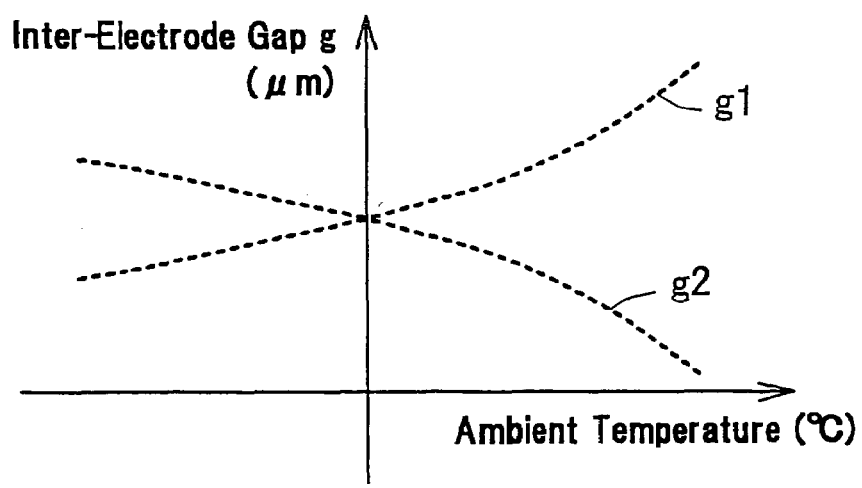
FIG. 31 is a schematic diagram showing a temperature dependency of an inter-electrode gap $g_1$ or $g_2$.

FIG. 30 is a schematic diagram showing an example of the temperature dependency of the sensor offset output (zero point output) in the case where no inertial force is exerted. For example, shown is a temperature dependency (broken line) in which the output increases in proportion to the temperature. A significant cause of the temperature dependency of the differential detection capacitances $C_1$ and $C_2$ should be a temperature dependency of the gap between the electrodes (see Formulae (2), (3), (6) and (7)). Such a temperature dependency results in the temperature dependency of the offset output or the sensitivity as indicated by the broken line in FIG. 30. It should be corrected to a temperature dependency-free state as indicated by the solid line in FIG. 30. FIG. 31 shows a temperature dependency of a gap $g_1$ or $g_2$ between a pair of electrodes, which correspond to the solid line of FIG. 30. In order to suppress the temperature dependency of the offset output, voltage may be applied to the fixed electrodes in such a manner that a pair of gaps between the movable mass member and the sensing electrodes can be equal to each other.

Figure 32:
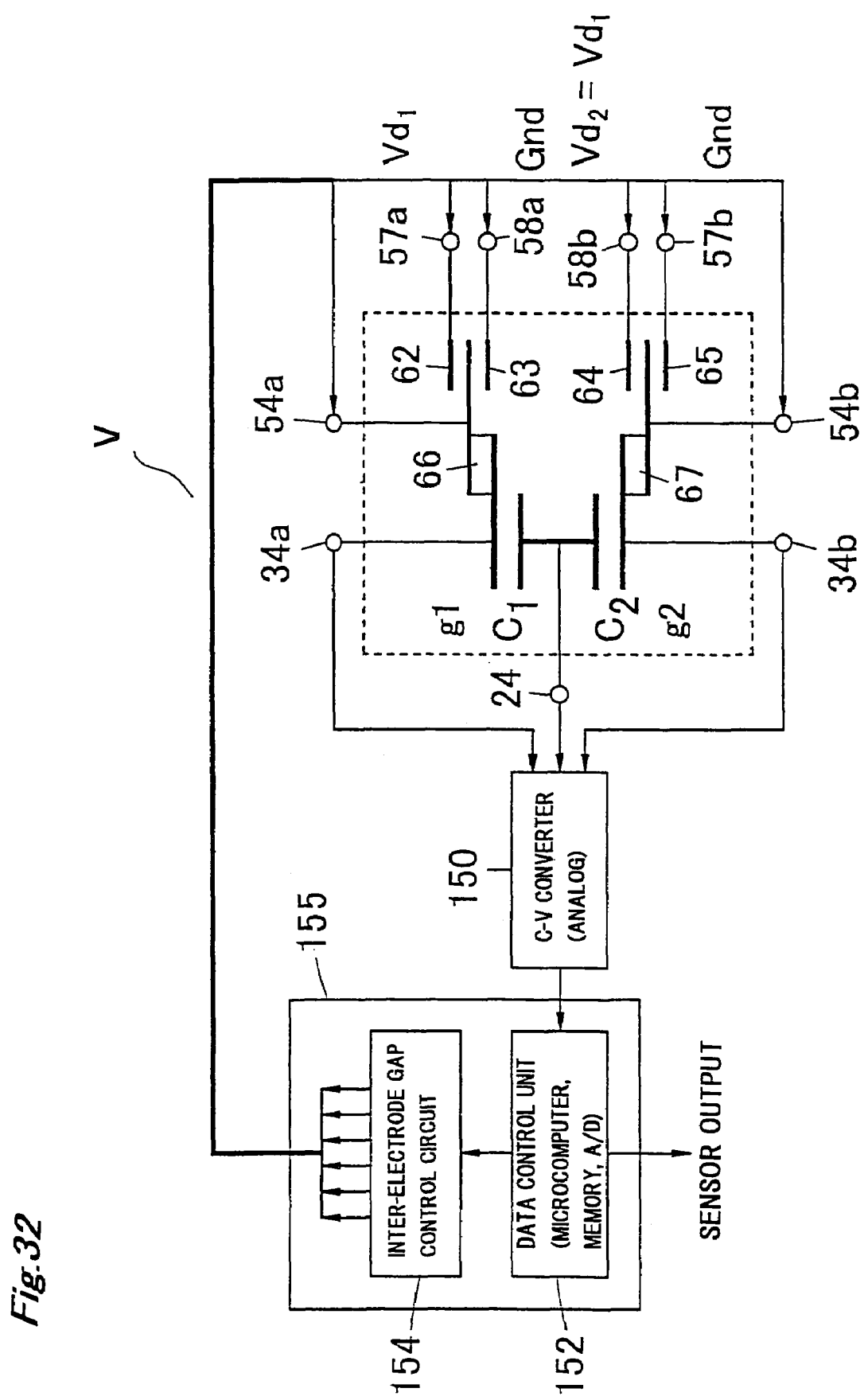
FIG. 32 is a schematic diagram showing a configuration of a drift compensating mechanism of a sensor according to an eighth embodiment of the invention.
Figure 33:
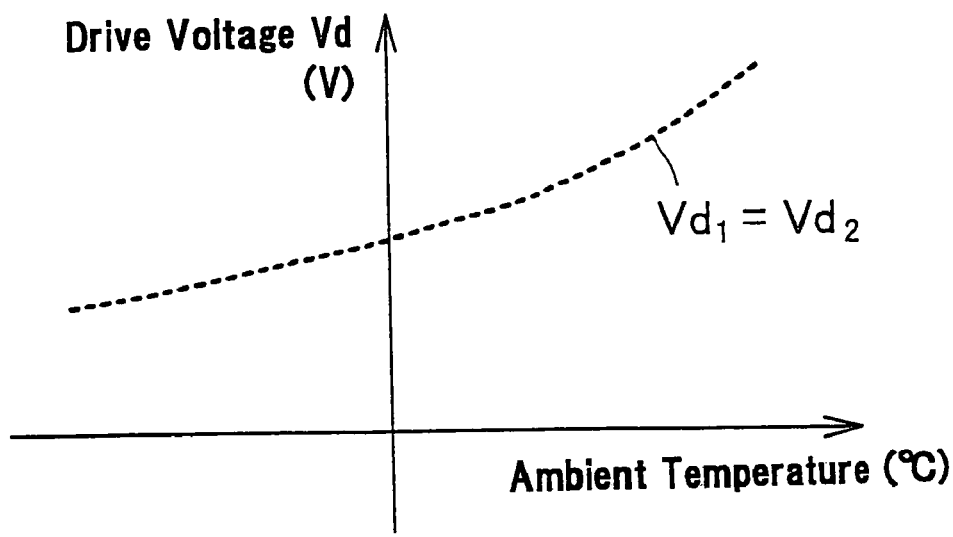
FIG. 33 is a schematic diagram showing a temperature dependency of a drive voltage $Vd_1$ or $Vd_2$ shown in FIG. 32.
Figure 34:
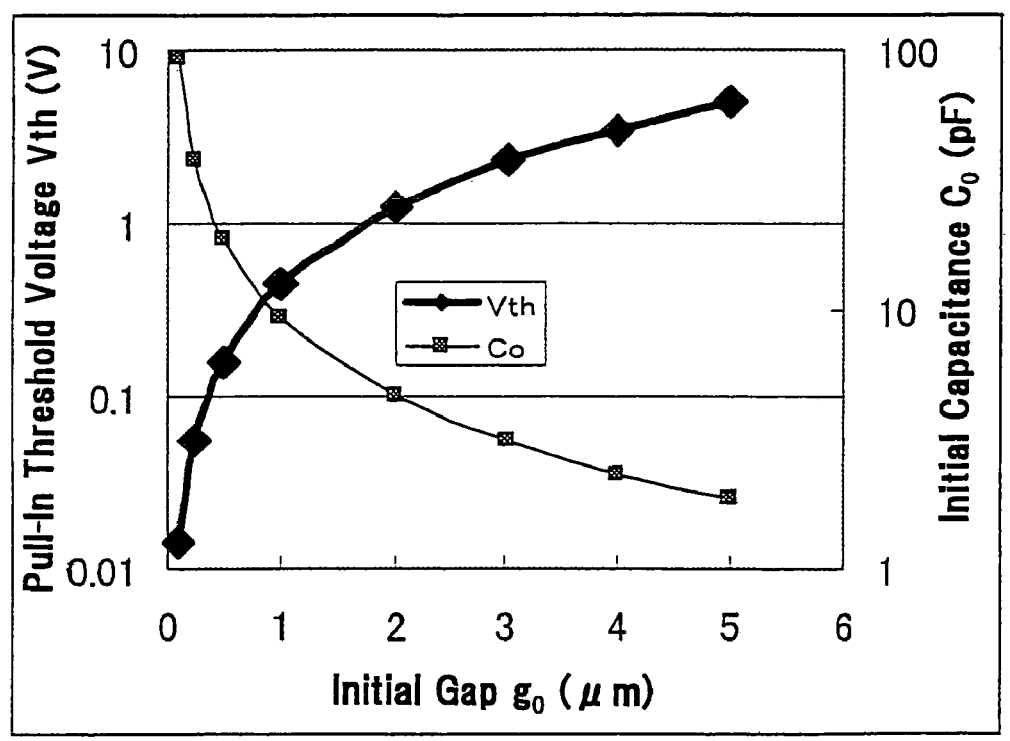
FIG. 34 is a graph showing a result of simulation with respect to the relationship between the pull-in threshold voltage and the gap between the electrodes.

The inventive inertial sensor structure has a variable gap between the electrodes. In such a structure, the gap between the electrodes can be adjusted by the movement of the sensing electrodes in such a manner that the temperature dependency of the offset output can be cancelled. FIG. 32 is a schematic diagram showing the configuration of a sensor V according to this embodiment, which includes any one of the sensor elements as used in the first to sixth embodiments, a C-V converter circuit 150, and a drift compensating mechanism 155. The drift compensating mechanism 155 includes a data control unit 152 including a microcomputer, a memory and an A/D converter; and an inter-electrode gap control circuit 154 which drives each detection unit based on signals from the data control unit 152. As shown in FIG. 32, for example, terminals 58a and 57b are set at the Gnd potential, and terminals 57a and 58b are connected to voltage sources $Vd_1$ (=$Vd_2$) and $Vd_2$, respectively. In such a configuration, $g_1$ decreases, as $g_2$ increases, so that both gap values can be matched to each other. Thus, the temperature dependency of the offset output can be so cancelled that the offset output can be kept at a specific value. Specifically, a drive voltage defined by the temperature-drive voltage curve of FIG. 33 is applied at each temperature.

More specifically, the sensor element is placed in a thermal chamber, and measurement is performed on the temperature dependency of the offset output at each temperature. Each compensable voltage value at each temperature is then stored in the memory of the data control unit 152 of the drift compensating mechanism 155, based on the voltage information from the C-V converter circuit 150. A specific compensating drive voltage at each temperature is applied to the sensing electrode in such a manner that the offset output can be cancelled based on signals from the data control unit 152. In an actual use case, the compensating drive voltage at each temperature is set in response to sensor signals from a temperature sensor (not shown) to displace and drive the sensing electrode. Thus, the temperature dependency of the zero point output and the sensitivity can be compensated without the occurrence of any temperature dependency of the gap between the electrodes.

What is claimed is:

1. An inertial detecting device for detecting a change in capacitance of a sensor element caused by an inertial force, the sensor element comprising:
    a substrate and a structure bonded to the substrate with a gap between at least part of the structure and the substrate, wherein,
        the structure includes a displaceable unit and at least one pair of detection units for detecting displacement of the displaceable unit,
        the displaceable unit includes a movable mass member displaceable along an inertial force direction, a pair of beams which are connected to the movable mass member and support the movable mass member in a space opposite the gap, and a pair of anchors which support the beams and are bonded to the substrate,
        each of the detection units includes a respective pair of sensing electrodes, respective sensing electrodes of each pair being disposed on opposite first and second sides of the displaceable unit, each of the sensing electrodes is supported opposite and spaced from the substrate, and each pair of sensing electrodes defines a respective pair of variable gaps between the sensing electrodes and the displaceable unit, each pair of variable gaps having a respective different width when the displaceable unit is not displaced, and
        each of the detection units includes a drive unit for moving each sensing electrode toward and away from the displaceable unit.

2. The inertial detecting device according to claim 1, wherein the sensor element comprises a damper including a pair of damping electrodes, the damping electrodes being disposed on opposite sides of the displaceable unit and forming damper gaps with the displaceable unit, narrower than the gaps of the sensing electrodes of the detection units and the displaceable unit, the damper contacting the displaceable unit, upon displacement of the displaceable unit, before the sensing electrodes of the detection units contact the displaceable unit.

3. The inertial detecting device according to claim 1, wherein the sensor element has respective different measurement ranges set by respective detection units, and the detecting device comprises an automatic range-changing mechanism which compares output voltage of the sensor element with a measurement range-defining threshold voltage and selects one of the detection units to provide an optimal measurement range according to the comparison.

4. The inertial detecting device according to claim 1, wherein the sensor element has respective different measurement ranges set by changing the variable gap stepwise, and the detecting device comprises an automatic range-changing mechanism which compares output voltage of the sensor element with a measurement range-defining threshold voltage and changes measurement range by changing the variable gap according to the comparison.

5. The inertial detecting device according to claim 1, wherein the drive unit is connected with the sensing electrode via an insulating layer.

6. The inertial detecting device according to claim 5, wherein the drive unit comprises a pair of fixed electrodes, fixed on the substrate, and a drive electrode which is displaceable by an electrostatic attraction between the fixed electrodes and the drive electrode.

7. The inertial detecting device according to claim 5, further comprising a feedback mechanism which applies a voltage to the drive unit for moving the sensing electrodes so that after a displacement, a gap between the movable mass member and the sensing electrodes returns to an original value, before the displacement.

8. The inertial detecting device according to claim 5, further comprising a feedback mechanism which changes potential difference between the movable mass member and the sensing electrodes, so that an electrostatic attraction cancels displacement of the movable mass member.

9. The inertial detecting device according to claim 5, further comprising a drift compensating mechanism for compensating temperature dependency of zero point output and sensitivity by applying a voltage to the drive unit to equalize gaps between the movable mass member and the sensing electrodes.

10. The inertial detecting device according to claim 1, further comprising a C-V converter for converting a change in capacitance into a voltage, the converter storing equal quantities of charge in a pair of capacitors defined by a pair of the sensing electrodes and the movable mass member.

* * * * *